US012732727B2

(12) United States Patent
Youn

(10) Patent No.: US 12,732,727 B2
(45) Date of Patent: Sep. 8, 2026

(54) SOUND DEVICE AND DISPLAY DEVICE INCLUDING THE SAME

(71) Applicant: LG ELECTRONICS INC., Seoul (KR)

(72) Inventor: Hyunseung Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 215 days.

(21) Appl. No.: 18/647,227

(22) Filed: Apr. 26, 2024

(65) Prior Publication Data

US 2024/0365036 A1 Oct. 31, 2024

(30) Foreign Application Priority Data

Apr. 28, 2023 (KR) ........................ 10-2023-0056238

(51) Int. Cl.
*H04R 1/02* (2006.01)

(52) U.S. Cl.
CPC ............. *H04R 1/025* (2013.01); *H04R 1/028* (2013.01); *H04R 2400/11* (2013.01); *H04R 2499/15* (2013.01)

(58) Field of Classification Search
CPC .... H04R 1/025; H04R 1/028; H04R 2400/11; H04R 2499/15
See application file for complete search history.

(56) References Cited

U.S. PATENT DOCUMENTS 6,760,460 B1 * 7/2004 Jeon ........................ H04N 5/642 381/388
6,990,212 B2 * 1/2006 Kambe .................... H04R 1/02 381/387
7,717,227 B2 * 5/2010 Kusano .................. H04R 1/025 181/149
7,894,182 B2 * 2/2011 Wang .................... G06F 1/1605 349/56
7,995,786 B2 * 8/2011 Yu .......................... H04R 1/025 381/388
8,540,199 B2 * 9/2013 Ke .......................... H04R 1/025 248/220.21
10,085,079 B2 * 9/2018 Sato .......................... H04R 7/02
10,999,663 B2 * 5/2021 Xu .......................... H04N 5/642
11,140,467 B2 * 10/2021 Choi ...................... H04R 1/028
12,152,620 B2 * 11/2024 Sicot ........................ F16B 21/02
2003/0059077 A1 * 3/2003 Kambe .................... H04R 1/02 381/388

(Continued)

FOREIGN PATENT DOCUMENTS

EP 3 343 272 A1 7/2018
JP 2011-30212 A 2/2011

(Continued)

*Primary Examiner* — Oyesola C Ojo
(74) *Attorney, Agent, or Firm* — Birch, Stewart, Kolasch & Birch, LLP

(57) ABSTRACT

A sound device can include a frame, a speaker disposed adjacent to the frame, a coupling part disposed at one side of the speaker, and facing toward the frame, and a holder positioned between the frame and the coupling part of the speaker, the holder being coupled to the frame and coupled to the coupling part of the speaker. Also, the holder penetrates into a portion of the frame in a direction extending toward the frame from the coupling part.

26 Claims, 27 Drawing Sheets

(56) References Cited

U.S. PATENT DOCUMENTS

| | | | | |
|---|---|---|---|---|
| 2005/0117768 | A1* | 6/2005 | Tamura | H04R 1/2819<br>381/345 |
| 2013/0182884 | A1* | 7/2013 | Mitsuhashi | H04R 1/028<br>381/395 |
| 2017/0227037 | A1* | 8/2017 | DeCosta | F16B 13/0833 |
| 2017/0280234 | A1* | 9/2017 | Choi | H04R 1/025 |
| 2018/0191989 | A1* | 7/2018 | Wang | H04R 1/025 |
| 2019/0082247 | A1* | 3/2019 | Kumakura | H04R 1/025 |
| 2019/0104350 | A1* | 4/2019 | Xu | A47B 97/00 |
| 2021/0200283 | A1* | 7/2021 | Park | G02F 1/133308 |
| 2022/0174396 | A1* | 6/2022 | Kim | H04R 5/04 |
| 2022/0248115 | A1* | 8/2022 | Tanaka | H04N 5/642 |
| 2025/0274687 | A1* | 8/2025 | Jenia | H04R 1/026 |
| 2026/0002360 | A1* | 1/2026 | Wolff | E04B 9/0435 |

FOREIGN PATENT DOCUMENTS

| | | | |
|---|---|---|---|
| KR | 10-0308042 | B1 | 9/2001 |
| KR | 10-2006-0112072 | A | 10/2006 |

* cited by examiner

SOUND DEVICE AND DISPLAY DEVICE INCLUDING THE SAME

CROSS-REFERENCE TO RELATED APPLICATION

This application claims priority to Korean Patent Application No. 10-2023-0056238, filed in the Republic of Korea on Apr. 28, 2023, the entirety of which is incorporated herein by reference into the present application.

BACKGROUND

Field of the Invention

The present disclosure relates to a sound device and a display device having the same.

Description of the Related Art

As the information society develops, the demand for display devices is also increasing in various forms. In response to this, various display devices such as Liquid Crystal Display Device (LCD), Plasma Display Panel (PDP), Electroluminescent Display (ELD), Vacuum Fluorescent Display (VFD), and Organic Light Emitting Diode (OLED) have been researched and used in recent years.

Among these, the LCD panel includes a TFT substrate and a color filter substrate that face each other with a liquid crystal layer interposed therebetween, and can display an image by using light provided from a backlight unit. In addition, the OLED panel can display an image by depositing an organic material layer capable of self-emitting light on a substrate on which a transparent electrode is formed.

Such a display device has a speaker. Here, a speaker is a device that converts an electric acoustic signal into sound waves and outputs them. The speaker can be subdivided into a woofer, a midrange, and a tweeter according to a sound range.

Due to the recent slimming trend of display device, the thickness of speaker provided in a display device is also becoming thinner. Also, as display devices become thinner, there are issues regarding how to attach the speaker to the display that can still allow the display device to remain thin but do not impair image quality or produce undesirable vibrations, and manufacturing costs and complexity can increase.

SUMMARY OF THE DISCLOSURE

It is an objective of the present disclosure to solve the above and other problems.

Another objective of the present disclosure can be to provide a structure that couples a speaker to a frame and minimizes the transmission of vibrations of the speaker to the frame.

Another objective of the present disclosure can be to provide a structure that minimizes the cost for coupling a speaker and a frame.

Another objective of the present disclosure can be to provide a sound device that can minimize volume loss of a speaker due to a coupling structure between the speaker and a frame located inside the speaker.

Another objective of the present disclosure can be to provide a structure capable of stably coupling a speaker to a frame while having a small thickness.

Another objective of the present disclosure can be to provide a structure capable of preventing a speaker from being shaken or separated from a frame while being coupled to the frame.

In accordance with an aspect of the present disclosure, a sound device can include: a frame; a speaker adjacent to the frame; a coupling part formed at one side of the speaker, and facing the frame; and a holder positioned between the frame and the coupling part, and coupled to the coupling part in a direction toward the coupling part from the frame, in which the holder can penetrate the frame in a direction toward the frame from the coupling part, and can be coupled to the frame.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE EMBODIMENTS

Figure 1:
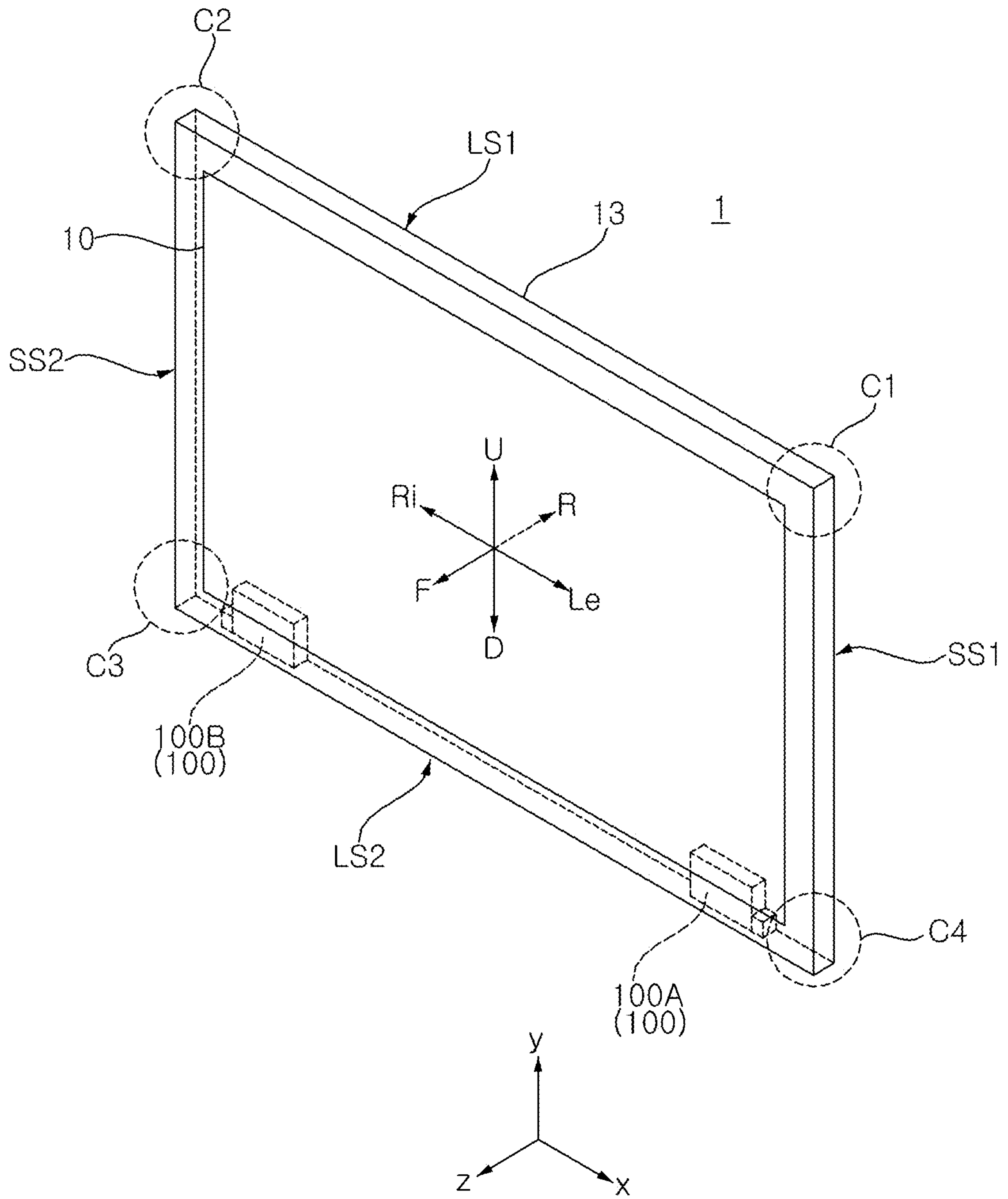
FIG. 1 illustrates an example of a display device including display panel according to an embodiment of the present disclosure.

Description will now be given in detail according to example embodiments disclosed herein, with reference to the accompanying drawings. For the sake of brief description with reference to the drawings, the same or equivalent components can be denoted by the same reference numbers, and description thereof will not be repeated.

In general, suffixes such as "module" and "unit" can be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. can be used herein to describe various elements, these elements should not be limited by these terms. These terms are only used to distinguish one element from another.

It will be understood that when an element is referred to as being "connected with" another element, there can be intervening elements present. In contrast, it will be understood that when an element is referred to as being "directly connected with" another element, there are no intervening elements present.

A singular representation can include a plural representation unless context clearly indicates otherwise.

In the following description, even if the embodiment is described with reference to specific drawings, if necessary, reference numerals not appearing in the specific drawings can be referred to, and reference numerals not appearing in the specific drawings are used in a situation where the above reference numerals appear in the other figures.

Direction indications of up (U), down (D), left (Le), right (Ri), front (F), and rear ® shown in the drawings are only for convenience of explanation, and the technical concept disclosed in this specification is not limited thereto.

Hereinafter, a display panel of the present disclosure can be an OLED panel described later with reference to FIG. 2 or an LCD panel described later with reference to FIGS. 3 and 4, but the present disclosure can be applied to various types of display panels excluding these.

Referring to FIG. 1, a display device 1 can include a display panel 10. The display panel 10 can display an image.

The display device 1 can include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of description, it is illustrated and described that the lengths of the first and second long sides LS1 and LS2 are longer than the lengths of the first and second short sides SS1 and SS2, but the lengths of the first and second long sides LS1 and LS2 can also substantially the same as the lengths of the first and second short sides SS1 and SS2.

A direction parallel to the long sides LS1 and LS2 of the display device 1 can be referred to as a left-right direction (e.g., horizontal direction). A direction parallel to the short sides SS1 and SS2 of the display device 1 can be referred to as an up-down direction (e.g., vertical direction). A direction perpendicular to the long sides LS1 and LS2 and the short sides SS1 and SS2 of the display device 1 can be referred to as a front-rear direction (e.g., a depth direction).

A direction in which the display panel 10 displays an image can be referred to as front (F, z), and a direction opposite to this can be referred to as rear R. The side of the first long side LS1 can be referred to as an upper side (U, y), and the side of the second long side LS2 can be referred to as a lower side D. The side of the first short side SS1 can be referred to as a left side (Le, x), and the side of the second short side SS2 can be referred to as a right side Ri.

The first long side LS1, the second long side LS2, the first short side SS1, and the second short side SS2 can be referred to as an edge of the display device 1. A guide panel 13 (see FIGS. 2 and 3) described later can define edges of the display device 1. A point where the first long side LS1, the second long side LS2, the first short side SS1, and the second short side SS2 meet each other can be referred to as a corner.

For example, a point where the first short side SS1 and the first long side LS1 meet can be referred to as a first corner C1. A point where the first long side LS1 and the second short side SS2 meet can be referred to as a second corner C2. A point where the second short side SS2 and the second long side LS2 meet can be referred to as a third corner C3. A point where the second long side LS2 and the first short side SS1 meet can be referred to as a fourth corner C4.

Figure 2:
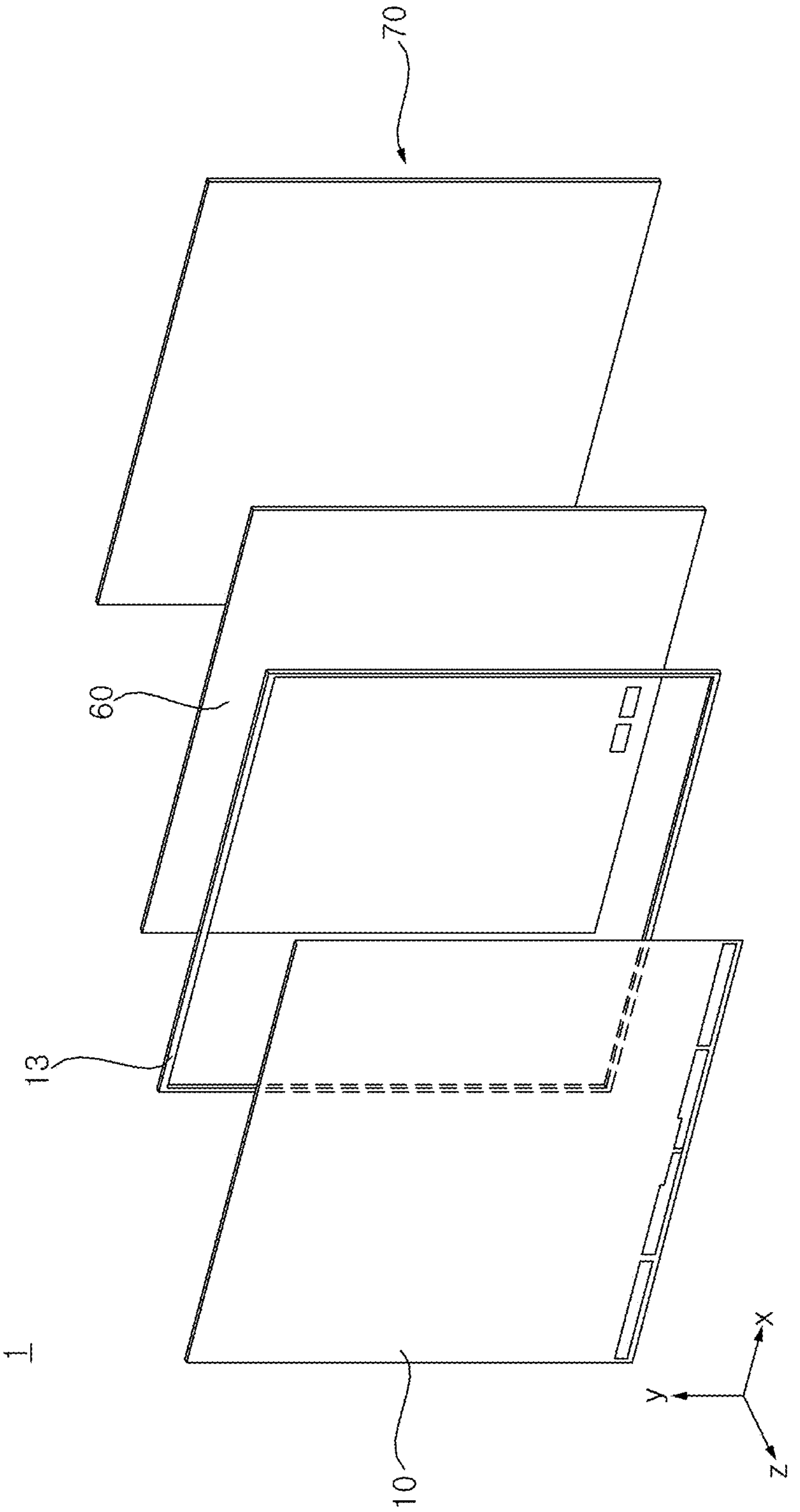
FIG. 2 illustrates an example of a display device including OLED panel according to an embodiment of the present disclosure.

Referring to FIG. 2, the display device 1 can include a display panel 10, a guide panel 13, a frame 60, and a back cover 70.

The display panel 10 can define the front surface of the display device 1, and can display an image. The display panel 10 can divide an image into a plurality of pixels and output an image by adjusting color, brightness, and saturation for each pixel. The display panel 10 can be divided into an active area in which an image is displayed and a non-active area in which an image is not displayed. The display panel 10 can generate light corresponding to red, green, or blue color according to a control signal. The display panel 10 can be referred to as an OLED panel.

The guide panel 13 can extend along the rim of the display panel 10. The guide panel 13 can be referred to as a middle cabinet 13 or a side frame 13.

The frame 60 can be located in a rear of the display panel 10, and can be coupled to the display panel 10. The guide panel 13 can be located between the display panel 10 and the frame 60, and can be coupled to the display panel 10 and the frame 60. Electronic components can be mounted on the frame 60. For example, the frame 60 can include a metal material such as aluminum alloy. The frame 60 can be referred to as a main frame 60, a module cover 60 or a bottom cover 60.

The back cover 70 can cover the rear of the frame 60. The back cover 70 can be coupled to the frame 60. For example, the back cover 70 can be an injection product made of resin. For another example, the back cover 70 can include a metal material.

Figure 3:
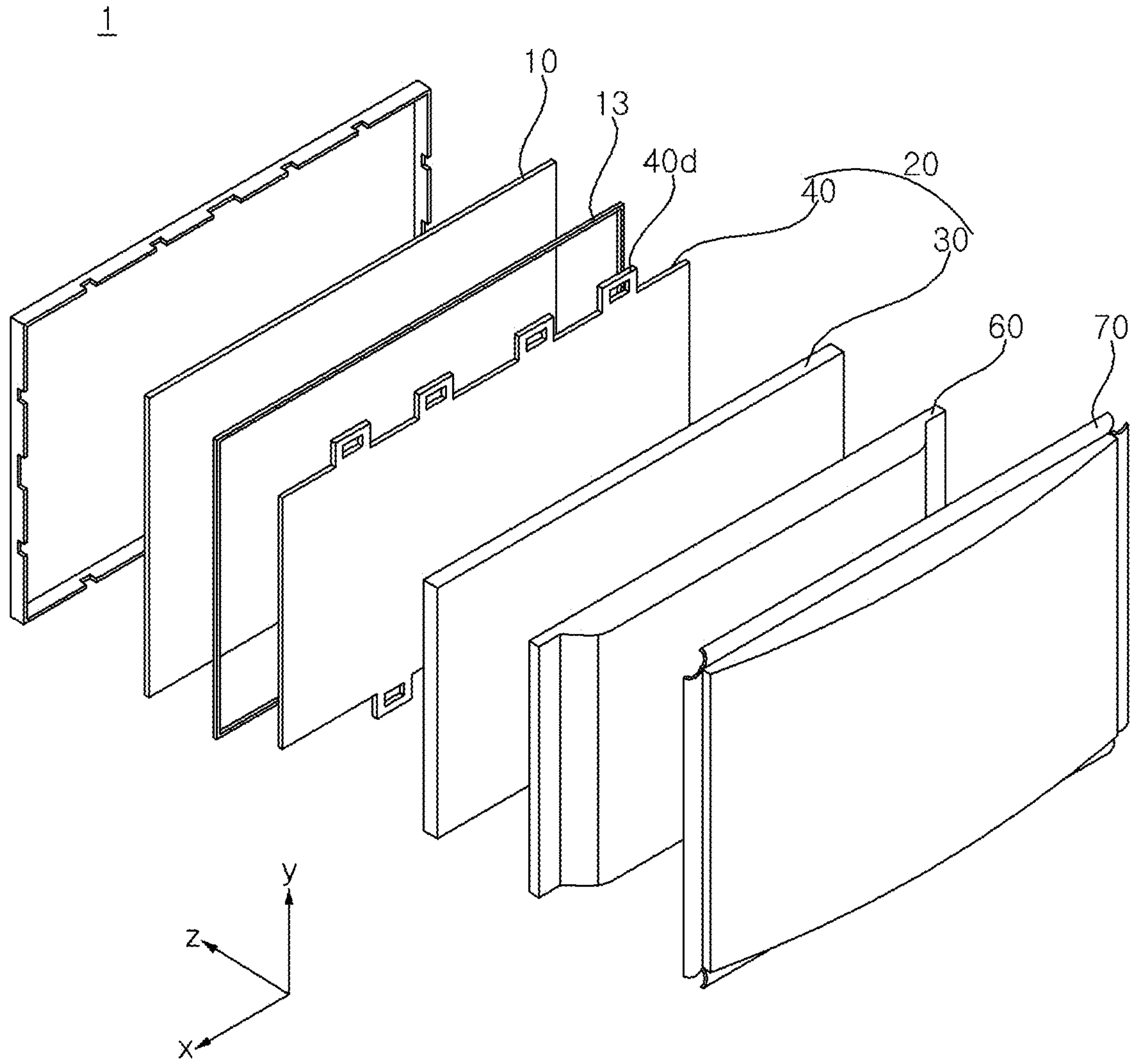
FIG. 3 illustrates an example of a display device including LCD panel according to an embodiment of the present disclosure.

Referring to FIG. 3, the display device 1 can include a display panel 10, a guide panel 13, a backlight unit 20, a frame 60, and a back cover 70.

The display panel 10 can define the front surface of the display device 1, and can display an image. The display panel 10 can display an image as a plurality of pixels output Red, Green, or Blue (RGB) for each pixel according to timing. The display panel 10 can be divided into an active area in which an image is displayed and a non-active area in which an image is not displayed. The display panel 10 can include a front substrate and a rear substrate that face each other with a liquid crystal layer therebetween. The display panel 10 can be referred to as an LCD panel.

The front substrate can include a plurality of pixels including red, green, and blue sub-pixels. The front substrate can output light corresponding to red, green, or blue color according to a control signal.

The rear substrate can include switching elements. The rear substrate can switch a pixel electrode. For example, the pixel electrode can change the molecular arrangement of the liquid crystal layer according to a control signal input from the outside. The liquid crystal layer can include liquid crystal molecules. The arrangement of liquid crystal molecules can be changed in response to a voltage difference generated between a pixel electrode and a common electrode. The liquid crystal layer can transmit light provided from the backlight unit 20 to the front substrate or block the light emitted from the backlight unit 20.

The guide panel 13 can extend along the rim of the display panel 10. The guide panel 13 can be referred to as a middle cabinet 13 or a side frame 13.

The backlight unit 20 can be located in a rear of the display panel 10. The backlight unit 20 can include a plurality of light sources. The backlight unit 20 can be coupled to the front surface of the frame 60. The backlight unit 20 can be driven by a full driving method or a partial driving method such as full array dimming, local dimming and impulsive. The backlight unit 20 can include an optical sheet 40 and an optical layer 30.

The optical sheet 40 can evenly transmit or disperse light from a light source to the display panel 10. The optical sheet 40 can be composed of a plurality of layers. For example, the optical sheet 40 can include a prism sheet or a diffusion sheet.

The frame 60 can be located in a rear of the display panel 10, and the display panel 10 can be coupled thereto. The guide panel 13 can be located between the display panel 10 and the frame 60, and can be coupled to the display panel 10 and the frame 60. Electronic components can be mounted on the frame 60. For example, the frame 60 can include a metal material such as aluminum alloy. The frame 60 can be referred to as a main frame 60, a module cover 60, or a bottom cover 60.

The back cover 70 can cover the rear of the frame 60. The back cover 70 can be coupled to the frame 60. For example, the back cover 70 can be an injection product made of resin or plastic. For another example, the back cover 70 can include a metal material.

Figure 4:
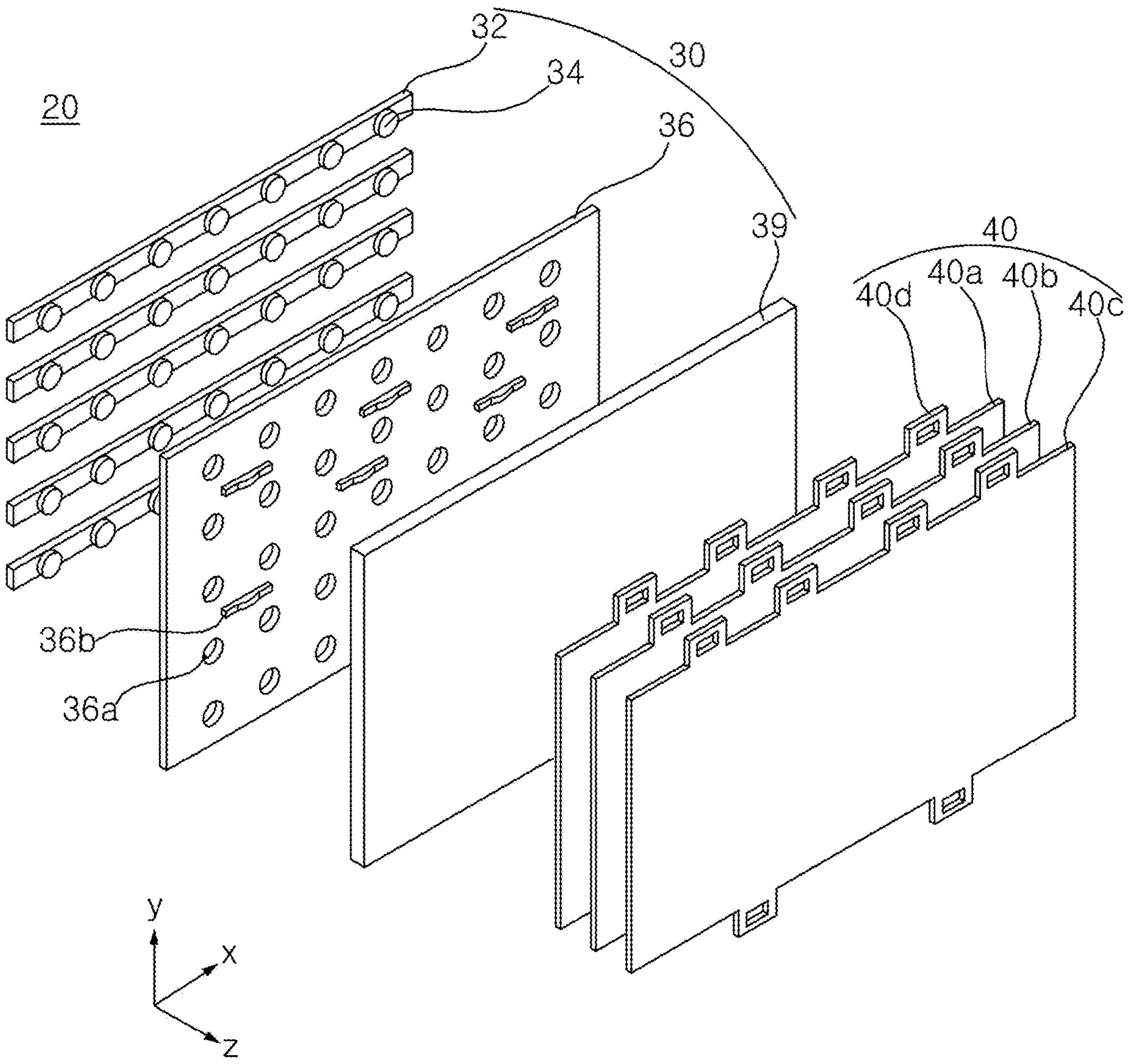
FIG. 4 illustrates an example of a backlight unit according to an embodiment of the present disclosure.

Referring to FIGS. 3 and 4, the backlight unit 20 can include an optical layer 30 and an optical sheet 40. The optical layer 30 can include a substrate 32, at least one light source 34, a reflective sheet 36, and a diffusion plate 39. For example, the optical layer 30 can include a plurality of LEDs.

The substrate 32 can be coupled to the front surface of the frame 60. The substrate 32 can have a plate shape, or can be composed of a plurality of straps spaced apart from each other in a vertical direction. The substrate 32 can be composed of at least one of polyethylene terephthalate (PET), glass, polycarbonate (PC), or silicon. The substrate 32 can be a Printed Circuit Board (PCB).

At least one light source 34 can be mounted on the substrate 32. A plurality of light sources 34 can be spaced apart from each other on the substrate 32. An electrode pattern for connecting an adapter and the light source 34 can be formed on the substrate 32. For example, a carbon nanotube electrode pattern for connecting the light source 34 and an adapter can be formed on the substrate 32.

For example, the light source 34 can be a light emitting diode LED chip or a light emitting diode package including at least one light emitting diode chip. The light source 34 can be composed of a colored LED emitting at least one color among various colors such as red, green, and blue, or a white LED. The colored LED can include at least one of a red LED, a green LED, or a blue LED. The light source 34 can be referred to as a light assembly 34.

The reflective sheet 36 can be located in front of the substrate 32. The reflective sheet 36 can be located on an area of the substrate 32 excluding an area where the light source 34 is formed. The reflective sheet 36 can have a hole 36*a* where the light source 34 is located.

In addition, the reflective sheet 36 can include at least one reflective material such as a metal or a metal oxide. For example, the reflective sheet 36 can include a metal having a high reflectance such as at least one of aluminum Al, silver Ag, gold Au, and titanium dioxide TiO 2 and/or metal oxide. For example, resin can be deposited or applied on the light source 34 and/or the reflective sheet 36. The resin can diffuse light from the light source 34. Accordingly, the reflective sheet 36 can reflect light from the light source 34 or light reflected from the diffusion plate 39 forward.

The diffusion plate 39 can be located in front of the reflective sheet 36. The diffuser plate 39 can diffuse light from the light source 34. A spacer 36*b* can be located between the reflective sheet 36 and the diffusion plate 39, and can support a rear surface of the diffusion plate 39. Accordingly, an air gap can be formed between the reflective sheet 36 and the diffusion plate 39, and light from the light source 34 can be widely spread by the air gap, which can also improve heat dissipation.

The optical sheet 40 can be located in front of the diffusion plate 39. The rear surface of the optical sheet 40 can be in close contact with the diffusion plate 39, and the front surface of the optical sheet 40 can be in close contact with or adjacent to the rear surface of the display panel 10. The optical sheet 40 can include a diffusion sheet and/or a prism sheet.

Figure 5:
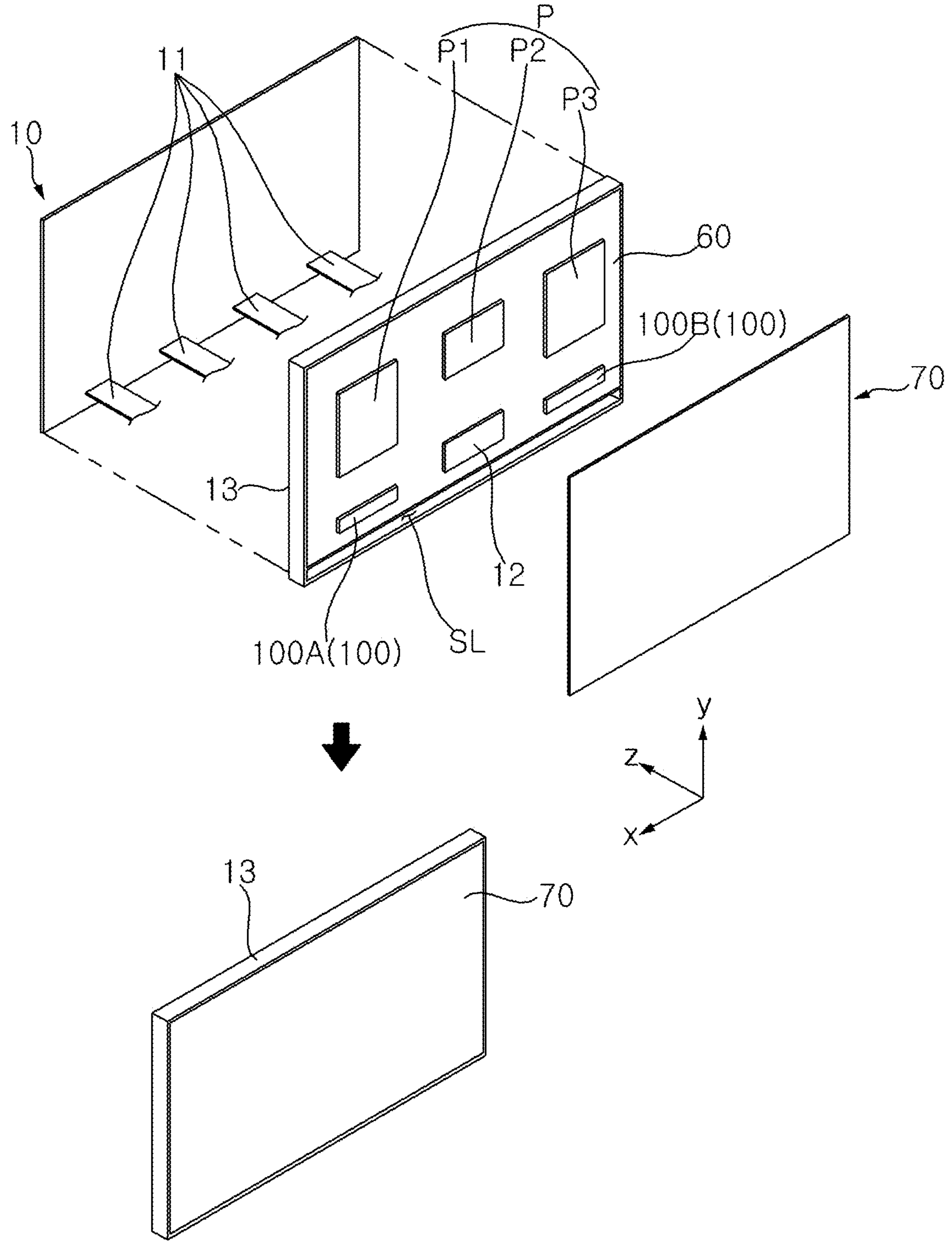
FIG. 5 illustrates an example of a printed circuit board PCB included in a display device according to an embodiment of the present disclosure.

Referring to FIG. 5, a board P can be coupled to the frame 60. The board P can be located between the frame 60 and the back cover 70, and can be coupled to the rear surface of the frame 60. A plurality of electronic elements can be mounted on the board P. The board P can be a printed circuit board PCB, and can be electrically connected to electronic components of the display device. A plurality of boards P can be coupled to the rear surface of the frame 80.

A power supply board P1 can supply power to each component of the display device. A main board P3 can control each component of the display device. A timing controller board P2 can be connected to the main board P3 through a cable, and can provide an image signal to the display panel 10.

The cable 11 can be electrically connected to the display panel 10 while being adjacent to the lower side of the display panel 10. The cable 11 can pass through a slit SL or hole formed in the frame 60. A source PCB 12 can be coupled to the rear surface of the frame 80 while being adjacent to the lower side of the frame 60, and can be electrically connected to the cable 11. The source PCB 12 can be electrically connected to the timing controller board P2 through a cable.

Accordingly, the timing controller board P2 can provide digital video data and a timing control signal to the display panel 10 through the source PCB 12.

The speaker 100 can be coupled to the frame 60. The speaker 100 can be located between the frame 60 and the back cover 70, and can be coupled to the rear surface of the frame 60. The speaker 100 can be adjacent to one side of the frame 60. The speaker 100 can be adjacent to the lower side of the frame 60, and can provide sound in a direction toward the front and lower side of the display device 1. For example, a plurality of speakers 100A, and 100B can be coupled to the frame 60.

The sound device can include a speaker 100, a frame 60, and various other components (e.g., a coupling unit or coupling part and a holder described later) for coupling the speaker 100 to the frame 60. The frame 60 can be the frame 60 of the above mentioned display device. Alternatively, the frame 60 can be a frame of an audio device.

Figure 6:
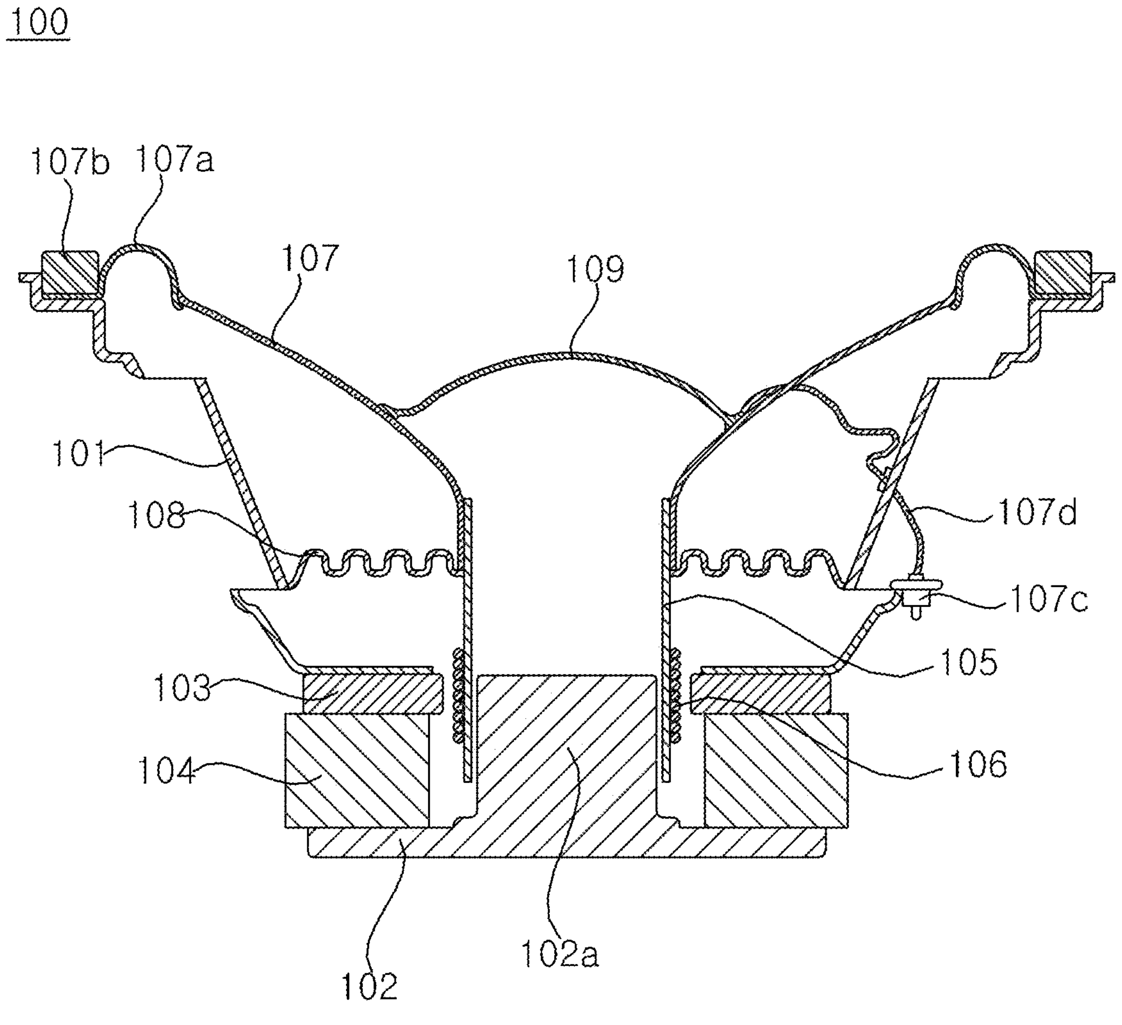
FIG. 6 illustrates an example of a speaker included in a display device according to an embodiment of the present disclosure.

Referring to FIG. 6, the speaker frame 101 can support various components of the speaker 100. The speaker frame 101 can be installed inside a housing 101H (see FIGS. 9, 16 and 23) of the speaker 100 described later.

A first plate 102 can form one side of the speaker 100. A pole piece 102*a* can protrude from the central portion of the first plate 102, and can have a hollow cylinder or solid cylinder shape. A second plate 103 can be spaced apart from the first plate 102, and can have a ring shape. A portion of the pole piece 102*a* can pass through the second plate 103, and an air gap can be formed between the second plate 103 and the pole piece 102*a*.

A magnet 104 can be disposed between the first plate 102 and the second plate 103, and can have a ring shape. A portion of the pole piece 102*a* can pass through the magnet 104. A bobbin 105 can be located in an air gap between the pole piece 102*a* and the second plate 103 and an air gap between the pole piece 102*a* and the magnet 104, and can have a hollow cylinder shape extending in the length direction of the pole piece 102*a*. A coil 106 can be formed or wound on or around the outer circumferential surface of the bobbin 105, and can be referred to as a voice coil 106. A terminal 107*c* and a tinsel wire 107*d* can transmit electrical energy output from an amplifier to the coil 106.

A spider 108 can have elasticity. The spider 108 can be located between the bobbin 105 and the speaker frame 101, and can be coupled to the bobbin 105 and the speaker frame 101. The spider 108 can support the bobbin 105, and can be referred to as a damper 108.

One side of a diaphragm 107 can be coupled or attached to the bobbin 105, and the other side of the diaphragm 107 can be supported by an elastic edge 107*a*. For example, the diaphragm 107 can have a cone or dome shape. A gasket 107*b* can be provided in or on a lateral surface of the edge 107*a*, and can prevent interference of peripheral devices with respect to the vibrating diaphragm 107. For example, a dust cap 109 can cover the central portion of the diaphragm 107, and prevent dust or the like from entering a magnetic circuit.

When a magnetic line of force is formed in the air gap by the magnet 104, and a current flows through the coil 106, a Lorentz force can be generated. The magnitude of the Lorentz force can be proportional to the magnitude of the magnetic line of force (magnetic flux density), the amount of current, and the length of the wound coil, and the direction of the force can be directed in a direction perpendicular to a plane formed by the magnetic flux density and the current.

Accordingly, the diaphragm 107 can vibrate in the length direction of the pole piece 102*a*. Based on FIG. 6, when the diaphragm 107 moves upward, (+) sound pressure can be generated, and when the diaphragm 107 moves downward, (−) sound pressure can be generated, and the speaker 100 can provide sound upward. According to the vibration of the diaphragm 107, the air inside the housing 101H (see FIG. 9) can also resonate, and the pressure thereof can be changed.

Figure 7:
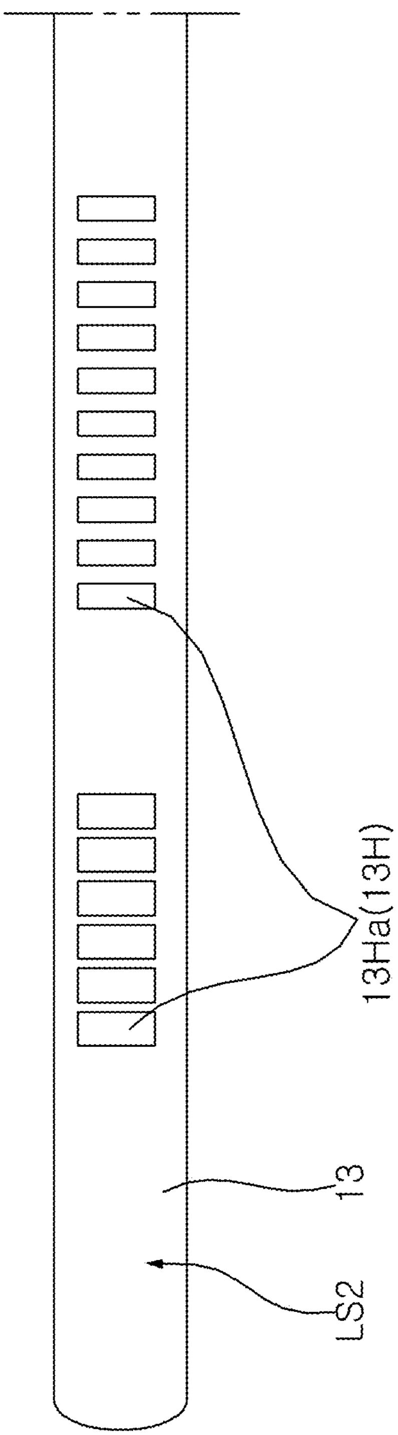
FIG. 7 illustrates an example of a guide panel included in a display device according to an embodiment of the present disclosure.

Referring to FIG. 7, an opening 13H can be formed in the guide panel 13 while being adjacent to the speaker 100 (see FIG. 5). For example, the speaker 100 can be adjacent to the second long side LS2 (e.g., the lower side of the display device 1), and the opening 13H can be formed in a portion of the guide panel 13 defining the second long side LS2. A sound output from the speaker 100 can be provided to the outside through the opening 13H. The opening 13H can be formed as a plurality of holes spaced apart from each other. For example, the plurality of openings 13H can face the plurality of speakers 100.

Figure 8:
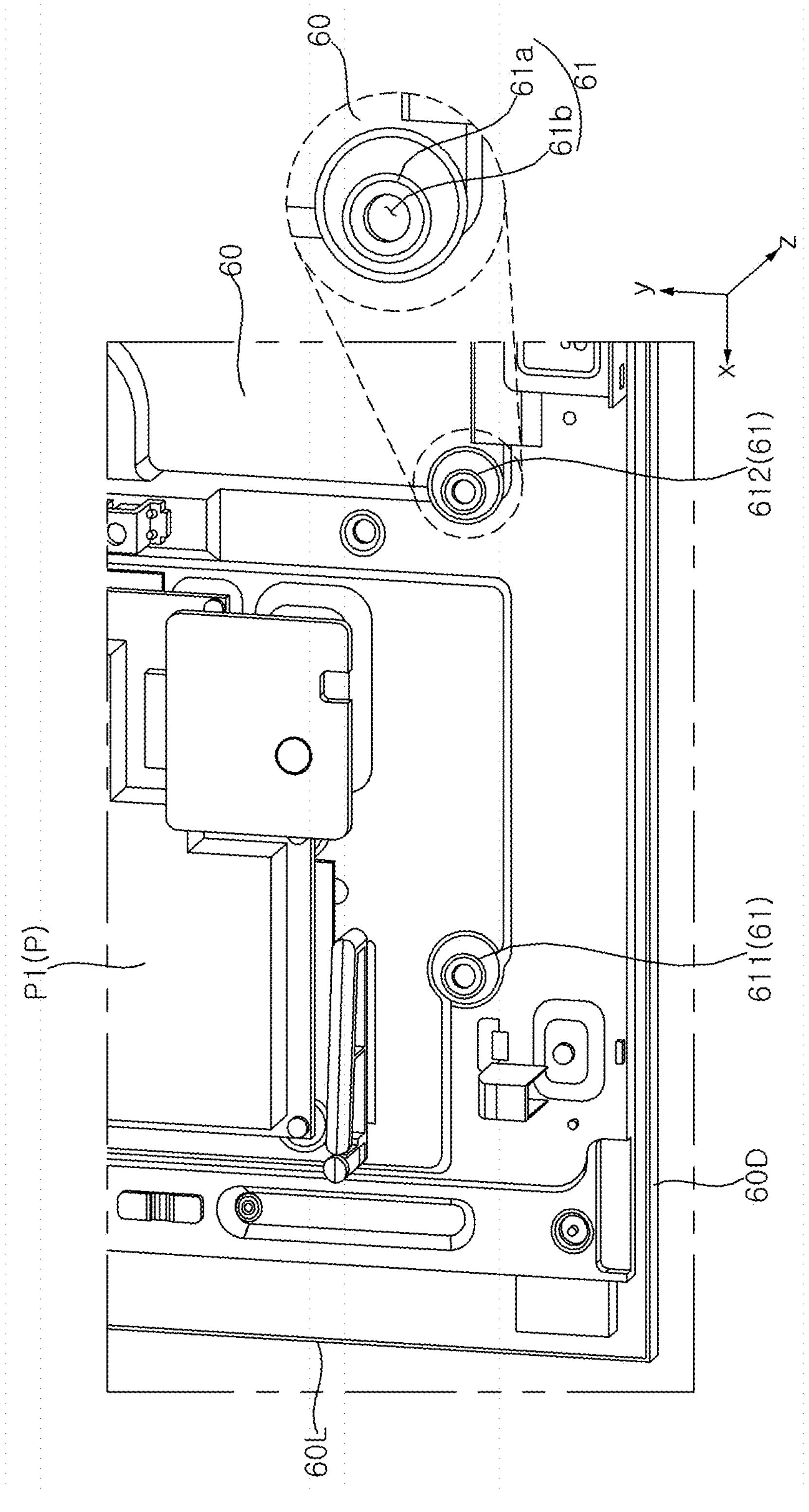
FIG. 8 illustrates an example of a fixing part included in a display device according to an embodiment of the present disclosure.

Referring to FIG. 8, a fixing part 61 can be formed while being pressed from the front surface of the frame 60 to the rear. The fixing part 61 can be referred to as a forming part 61. A fixing hole 61*b* can be formed by penetrating the fixing part 61. For example, a plurality of fixing parts 611 and 612 can be spaced apart from each other.

Figure 9:
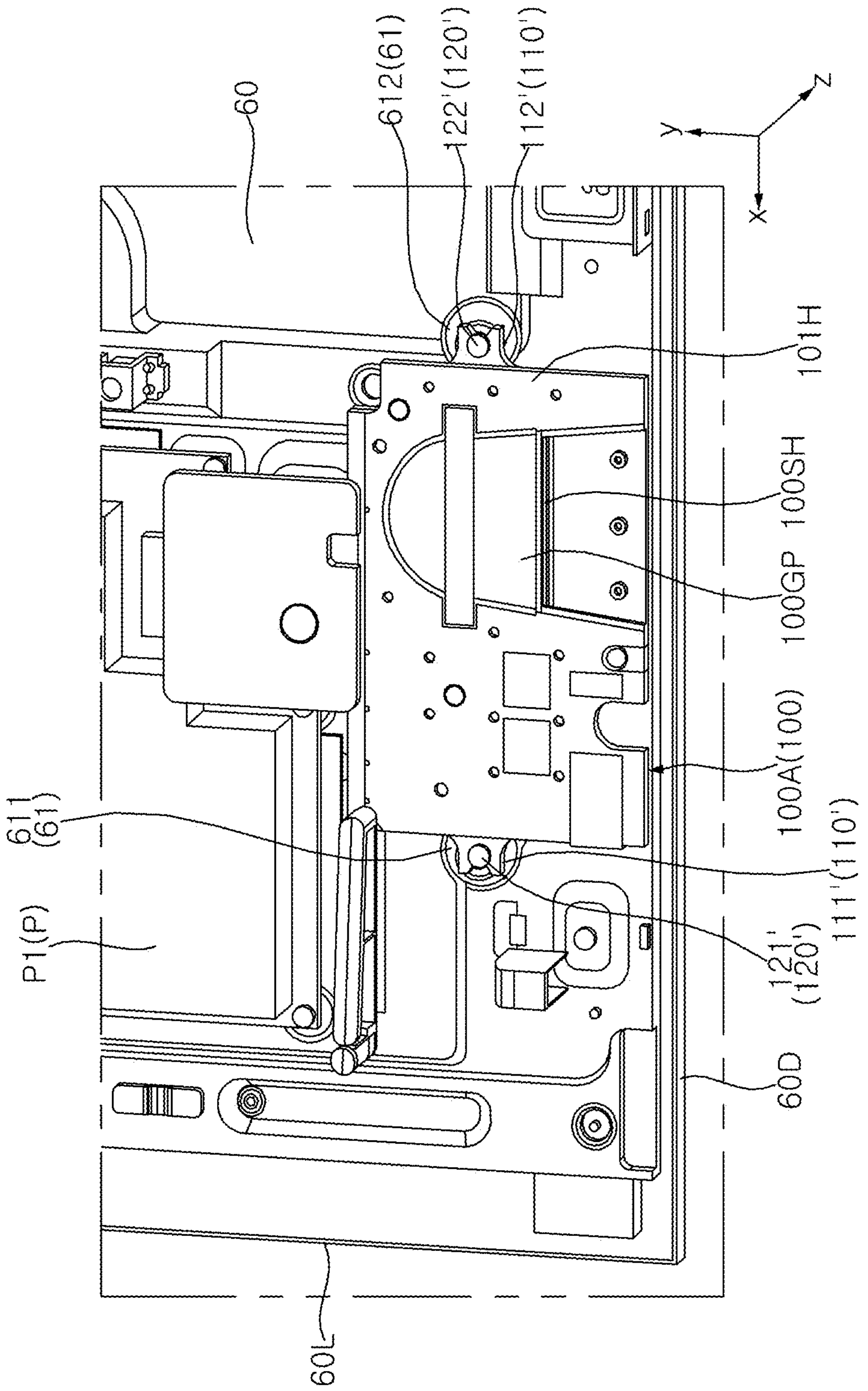
FIG. 9 illustrates an example of a housing for a speaker, in which the housing is attached to a frame included in a display device according to an embodiment of the present disclosure.

Referring to FIG. 9, components of the speaker 100 described above with reference to FIG. 6 can be disposed inside the housing 101H of the speaker 100. For example, the diaphragm 107 (see FIG. 6) of the speaker 100 can provide sound in a rearward direction, and the guide plate 100GP can guide the sound of the diaphragm 107 in a downward direction. Sounds guided by the guide plate 100GP can be provided to the openings 13H (see FIG. 7) through a speaker hole 100SH.

The speaker 100 can be adjacent to the lower side 60D of the frame 60. A first speaker 100A can be adjacent to the left side 60L of the frame 60, and a second speaker 100B (see FIG. 5) can be adjacent to the right side of the frame 60. A coupling part 110' can be formed in one side of the housing 101H, and can be coupled to the fixing part 61 through a holder 120'. For example, a plurality of coupling parts 111' and 112' can be spaced apart from each other, and can be coupled to a plurality of fixing parts 611 and 612 through a plurality of holders 121' and 122'. Accordingly, the speaker 100 can be coupled to the rear surface of the frame 60 and be securely held in place.

Figure 10:
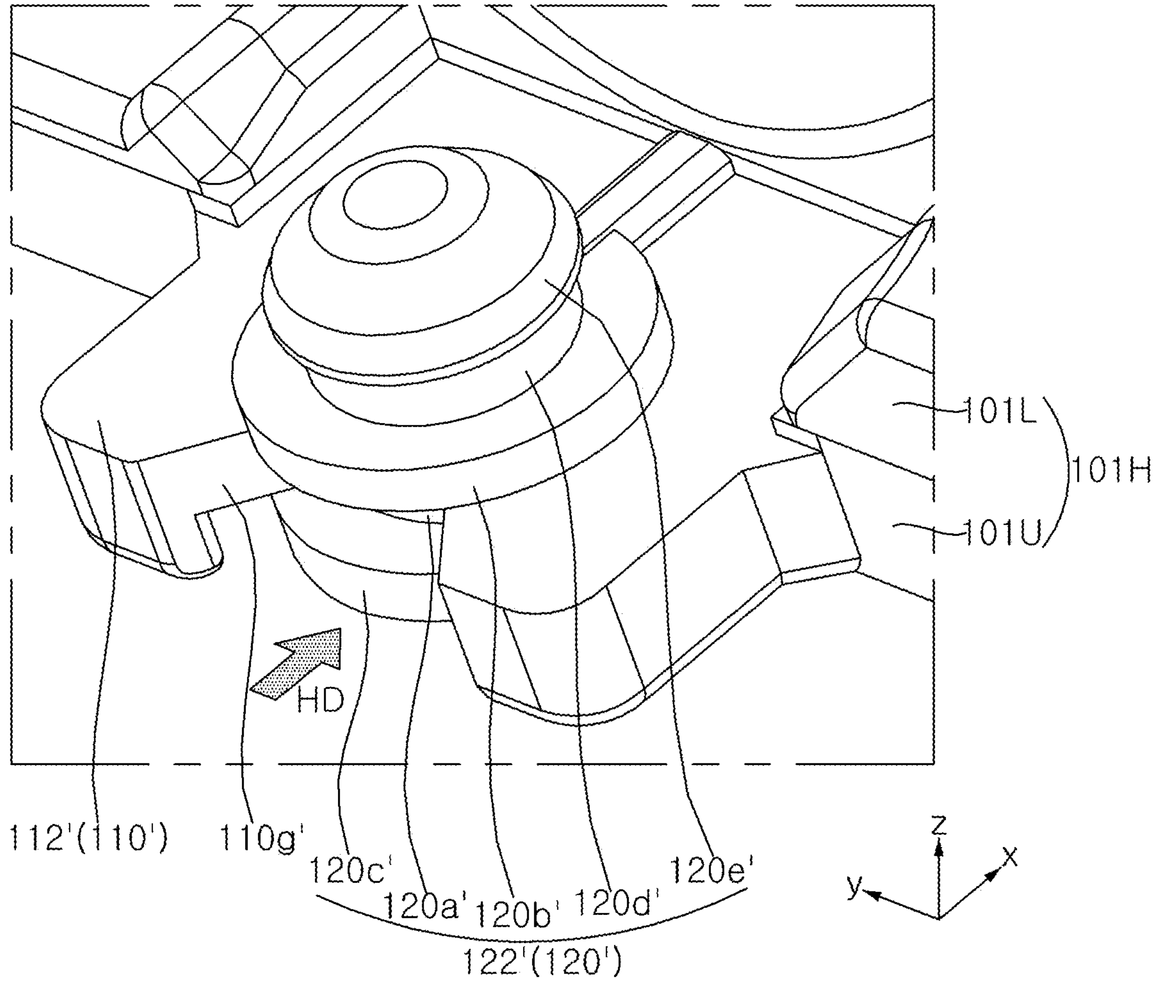
FIG. 10 illustrates an example of a coupling part formed on of a housing of a speaker and a holder included in a display device according to an embodiment of the present disclosure.
Figure 11:
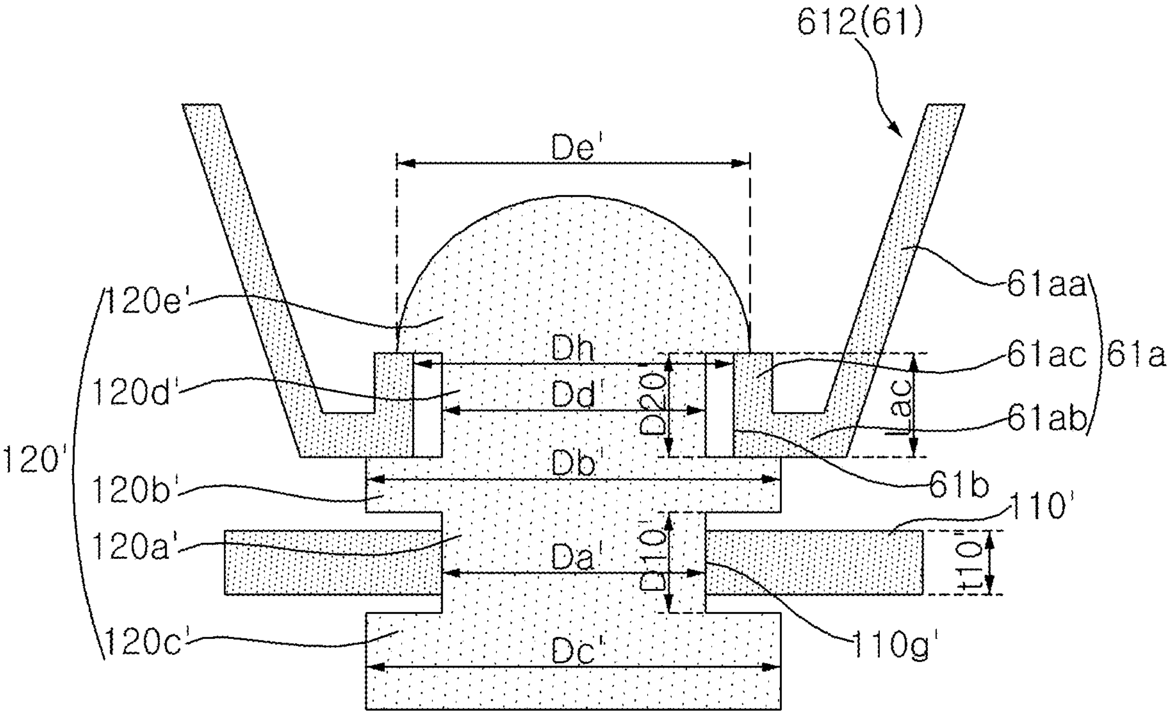
FIG. 11 illustrates an example cross section of a holder that can be detachably coupled to a coupling part for attaching a speaker according to an embodiment of the present disclosure.

Referring to FIGS. 10 and 11, the housing 101H can include an upper housing 101U and a lower housing 101L. The lower housing 101L can face the rear surface of the frame 60 (see FIG. 9), and the upper housing 101U can be opposite to the lower housing 101L and be coupled to the lower housing 101L. The inner space of the housing 101H can be formed between the lower housing 101L and the upper housing 101U.

The coupling part 110' can be formed in one side of the housing 101H. For example, the coupling part 110' can protrude outward from one side of the upper housing 101H. A groove 110*g'* can be formed from a distal end of the coupling part 110' to the inside of the coupling part 110'. The groove 110*g'* can extend in a horizontal direction (e.g., a direction on the XY plane) parallel to the housing 101H. For example, the groove 110*g'* can have a notched shape.

The holder 120' can include a body 120*a'*, 120*b'*, 120*c'*, a neck 120*d'*, and a head 120*e'*. The body 120*a'*, 120*b'*, 120*c'* can include a first part 120*a'*, a second part 120*b'*, and a third part 120*c'*. The holder 120' can have elasticity. The holder 120' can include a soft material such as rubber and silicon. For example, the holder 120' can be a type of rubber fastener or a push type retainer clip, which can help isolate the speaker from the frame 60. In other words, the holder 120' can act as a type of rubber isolation mount that can provide three different functions of attaching the speaker to the display device, allowing the overall device structure to remain slim, and also preventing or minimizing vibrations from being transferred to the display panel. Accordingly, the vibration of the speaker 100 coupled to the frame 60 can be suppressed from transmitting to the frame 60 through the holder 120'.

The first part 120*a'* can have a cylindrical shape, and can extend in a direction intersecting the groove 110*g'*. The second part 120*b'* can protrude from one end of the first part 120*a'* in the radial direction of the first part 120*a'* and can extend in the circumferential direction of the first part 120*a'*. The third part 120*c'* can protrude from the other end of the first part 120*a'* in the radial direction of the first part 120*a'*, and can extend in the circumferential direction of the first part 120*a'*. For example, each of the third part 120*c'* and the second part 120*b'* can have a ribbed shape or a fin shape. The diameter Da' of the first part 120*a'* can be equal to or larger than the diameter of the groove 110*g'*. The diameter Db' of the second part 120*b'* and the diameter Dc' of the third part 120*c'* can be equal to each other, and can be larger than the diameter Da' of the first part 120*a'*. The distance D10' between the second part 120*b'* and the third part 120*c'* can be equal to or larger than the thickness t10' of the coupling part 110'. When the first part 120*a'* is inserted into the groove 110*g'* in the horizontal direction (see arrow HD in FIG. 10), the coupling part 110' can be located between the second part 120*b'* and the third part 120*c'*. That is, the holder 120' can be detachably coupled to the coupling part 110'. Also, the second part 120*b'* can form a type of circular, rubber washer that is disposed between the fixing part 61 and the coupling part 110'.

The neck 120*d'* can protrude from the one end of the first part 120*a'* in the length direction of the first part 120*a'*, and can face the fixing part 61.

The head 120*e'* can protrude from the distal end of the neck 120*d'* in the length direction of the first part 120*a'*, and can be stepped portion or a ridged shape portion with respect to the neck 120*d'*. The head 120*e'* can have a hemispherical or dome shape.

The fixing part 61 can include a fixing body 61*a* and a fixing hole 61*b*. The fixing part 61 can have a truncated cone shape as a whole. The fixed body 61*a* can include an inclined portion 61*aa*, a horizontal portion 61*ab*, and a vertical portion 61*ac*. The inclined portion 61*aa* can protrude rearward from the rear surface of the frame 60, and can have a smaller diameter or a tapered diameter as it is farther away from the rear surface. The horizontal portion 61*ab* can be bent from the distal end of the inclined portion 61*aa* to the inside of the inclined portion 61*aa*, and can have a ring shape parallel to the rear surface of the frame 60.

The vertical portion 61*ac* can be bent toward the rear surface of the frame 60 from the distal end of the horizontal portion 61*ab*. The horizontal portion 61*ab* and the vertical portion 61*ac* can define a boundary of the fixing hole 61*b*.

The diameter Dd' of the above mentioned neck 120*d'* can be equal to or smaller than the diameter Dh of the fixing hole 61*b*. The diameter De' of the head 120*e'* can be larger than the diameter Dh of the fixing hole 61*b*. The diameter Db' of the second part 120*b'* can be larger than the diameter Dh of the fixing hole 61*b*. As the length of the neck 102*d'*, the distance D20' between the second part 120*b'* and the head 120*e'* can be equal to or larger than the length Lac of the vertical portion 61*ac*. When the neck 120*d'* and the head 120*e'* are inserted into the fixing part 61 through the fixing hole 61*b*, the neck 120*d'* can be located in the fixing hole 61*b*, the second part 120*b'* can be hooked to the horizontal portion 61*ab*, and the head 120*e'* can be hooked to the vertical portion 61*ac*. That is, the holder 120' can be detachably coupled to the fixing part 61.

Accordingly, the speaker 100 can be coupled in the vertical direction to the fixing part 61 of the frame 60 through the holder 120' coupled in the horizontal direction to the coupling part 110' (see FIGS. 8 and 9).

Figure 12:
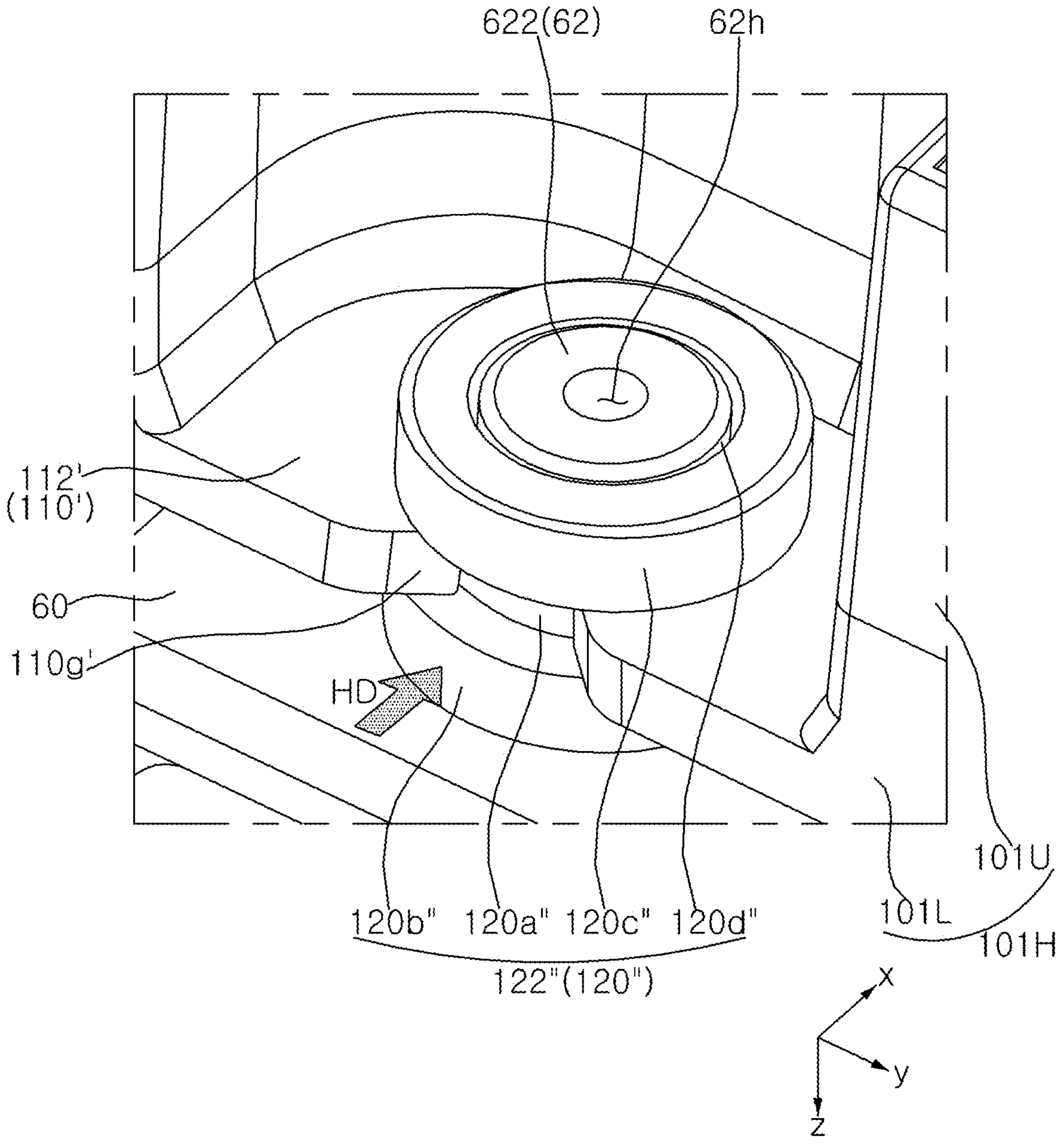
FIGS. 12-14 illustrates examples of a coupling arrangement between a coupling part, a holder and a protrusion or boss, according to an embodiment of the present disclosure.
Figure 13:
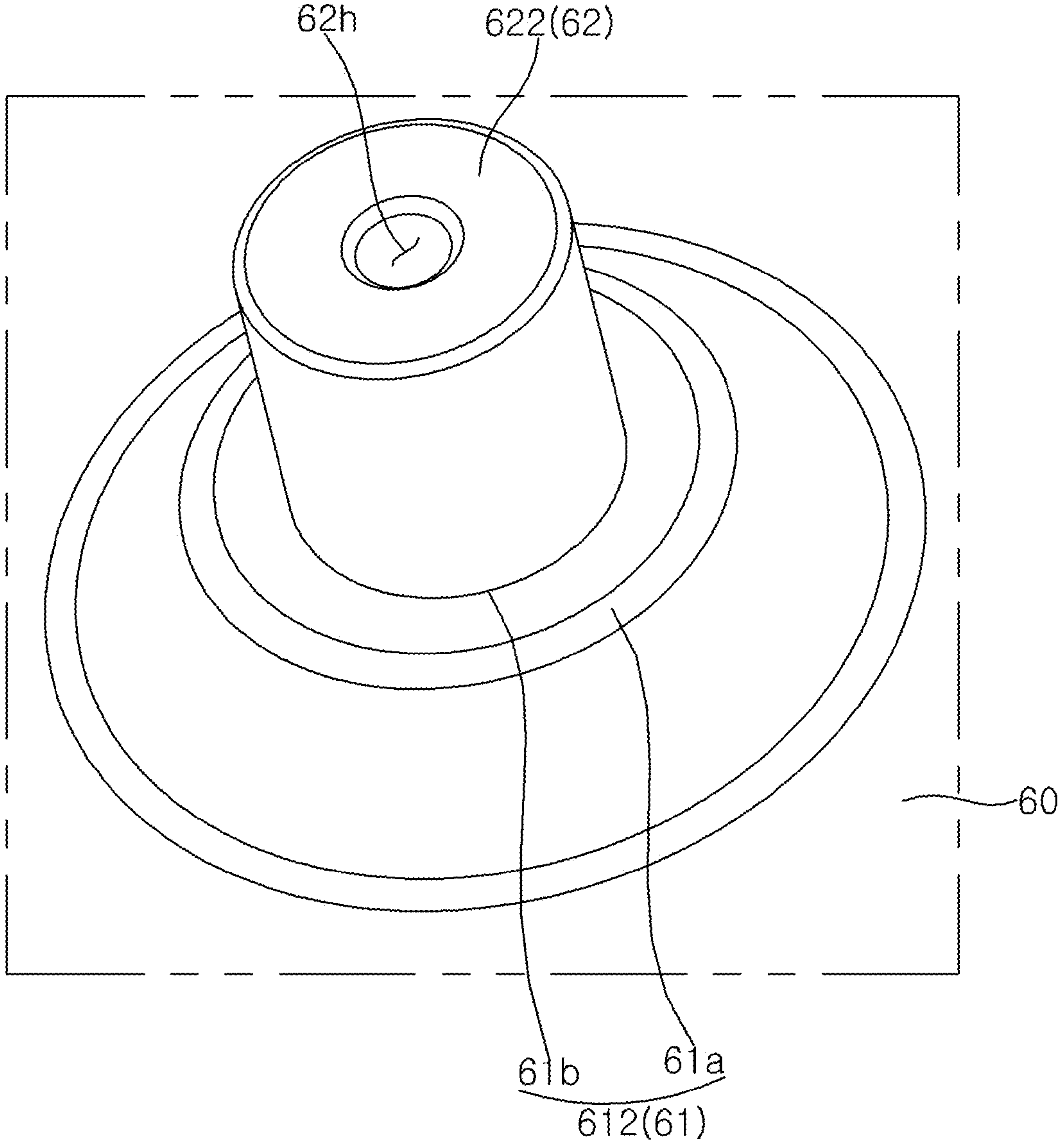
Figure 14:
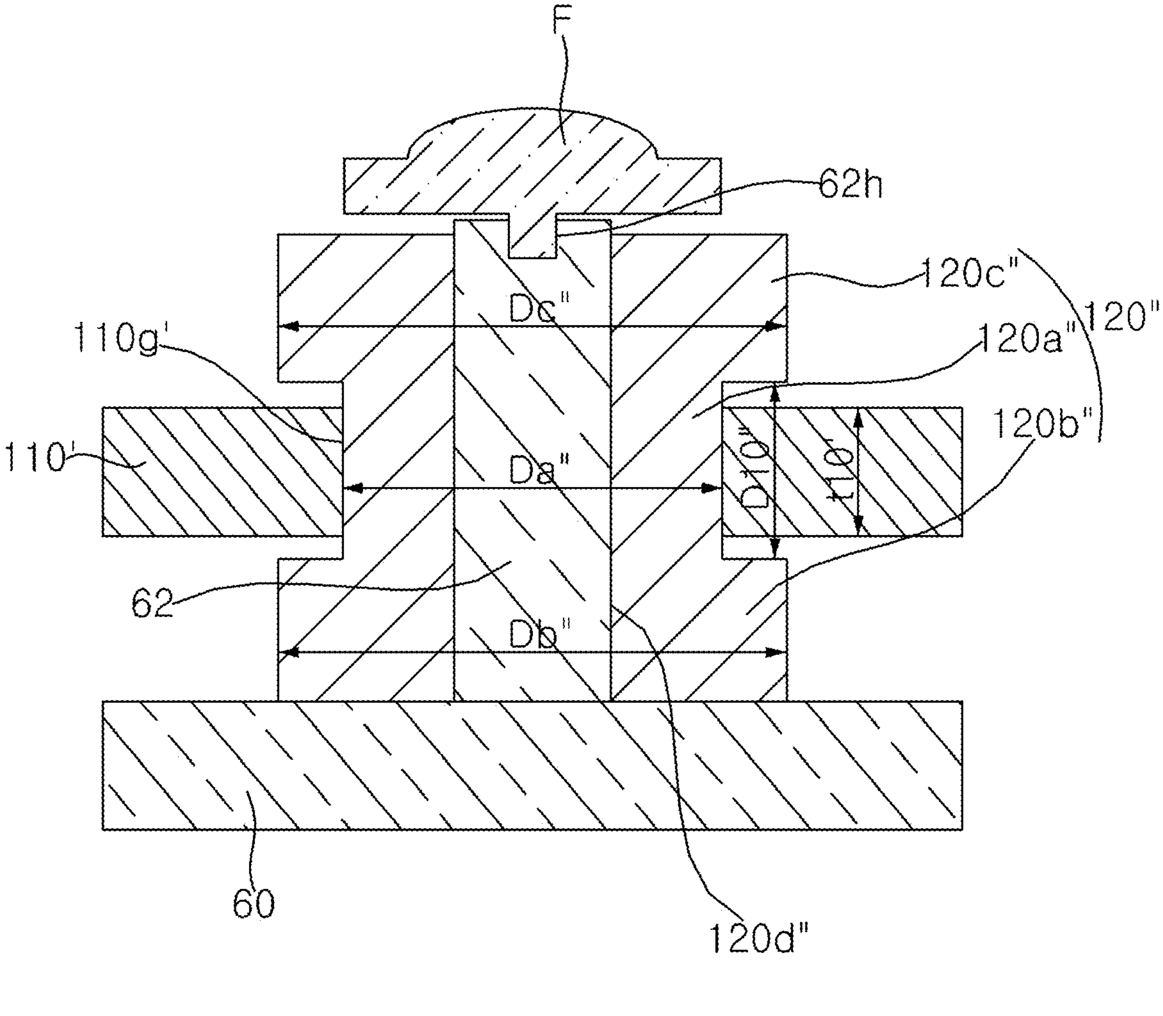

Referring to FIGS. 12 to 14, the coupling part 110' can be formed in one side of the housing 101H. For example, the coupling part 110' can be formed by recessing a part of the lower housing 101L. The groove 110*g'* can be formed from one side of the coupling part 110' to the inside of the coupling part 110'. The groove 110*g'* can extend in a horizontal direction (e.g., a direction on the XY plane) parallel to the housing 101H.

A holder 120" can include a body 120*a*," 120*b*," 120*c*" and a channel 120*d*." The body 120*a*," 120*b*," 120*c*" can include a first part 120*a*," a second part 120*b*," and a third part 120*c*." A holder 120" can have elasticity. The holder 120" can include a soft material such as rubber and silicon. Accordingly, transmission of vibration of the speaker 100 coupled to the frame 60 through the holder 120" to the frame 60 can be suppressed. Accordingly, the vibration of the speaker 100 coupled to the frame 60 can be suppressed or prevented from being transferred to the frame 60 through the holder 120."

The first part 120*a*" can have a cylindrical shape, and can extend in a direction intersecting the groove 110*g'*. The second part 120*b*" can protrude from one end of the first part 120*a*" in the radial direction of the first part 120*a*" and can extend in the circumferential direction of the first part 120*a*." The third part 120*c*" can protrude from the other end of the first part 120*a*" in the radial direction of the first part 120*a*," and can extend in the circumferential direction of the first part 120*a*." The diameter Da" of the first part 120*a*" can be equal to or larger than the diameter of the groove 110*g'*. The diameter Db" of the second part 120*b*" and the diameter Dc" of the third part 120*c*" can be equal to each other, and can be larger than the diameter Da" of the first part 120*a*." The distance D10" between the second part 120*b*" and the third part 120*c*" can be equal to or larger than the thickness t10' of a coupling part 110." When the first part 120*a*" is inserted into the groove 110*g'* in the horizontal direction (see arrow HD in FIG. 12), the coupling part 110' can be located between the second part 120*b*" and the third part 120*c*" and securely held in place. That is, the holder 120" can be detachably coupled to the coupling part 110'.

A boss 62 can protrude rearward from the frame 60 or the fixing part 61. The boss 62 can be referred to as a protrusion 62 or a protruding part 62. The boss 62 can be a pem nut or a type of push-in rivet. The boss 62 can be inserted into the channel 120d" formed in the central portion of the body 120a," 120b," 120c." A fastening member F, such as a screw, can be fastened to a hole 62h of the boss 62 inserted into the channel 120d." The diameter of the fastening member F can be larger than the diameter of the boss 62, and the fastening member F fastened to the hole 62h can be hooked to the third part 120c."

Accordingly, the speaker 100 can be vertically coupled to the boss 62 of the frame 60 through the holder 120" horizontally coupled to the coupling part 110'.

Figure 15:
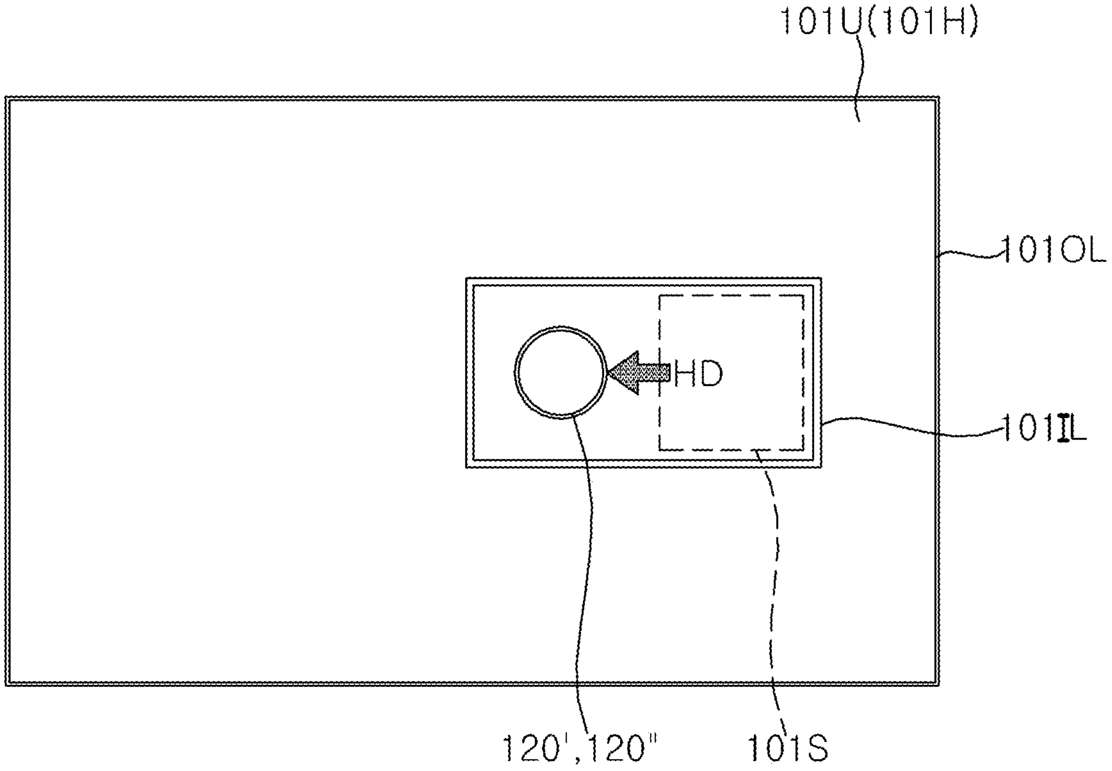
FIG. 15 illustrates another example of a holder according to an embodiment of the present disclosure.

Referring to FIG. 15, the holder 120" can include an outer boundary 101OL formed along the rim of the housing 101H and an inner boundary 101IL formed inside the outer boundary 101OL. The holder 120" can be adjacent to the outer boundary 101OL, and can be inserted into the groove 110g' by horizontal movement (see arrow HD in FIGS. 10 and 12) from the outside of the outer boundary 101OL (see FIGS. 10 and 12). Alternatively, the holder 120" can be located inside the inner rim 101IL (see FIG. 12). At this time, in order to insert the holder 120" into the groove 110g', a space 101S in which the holder 120" can move horizontally can be provided inside the inner boundary 101OL. However, due to the space 101S, the volume of the housing 101H can be reduced, and as a result, bass performance can be deteriorated. In addition, the coupling method of FIGS. 12 to 14 uses the boss 62 and the fastening member F, which can increase manufacturing cost.

Figure 16:
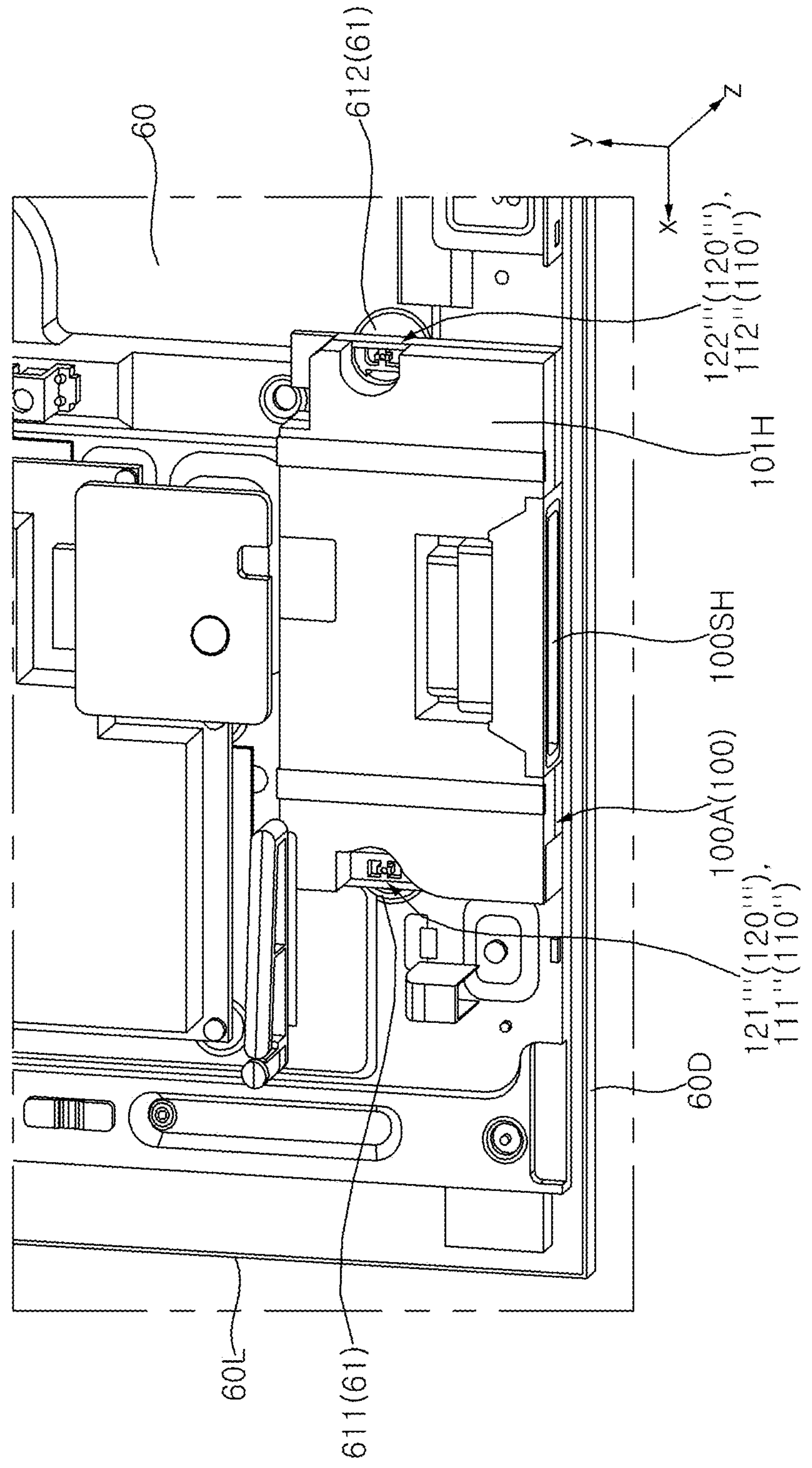
FIG. 16 illustrates another example of a housing of a speaker attached to a frame included in a display device according to an embodiment of the present disclosure.

Referring to FIG. 16, components of the speaker 100 described above with reference to FIG. 6 can be disposed inside the housing 101H of the speaker 100. For example, the diaphragm 107 (see FIG. 6) of the speaker 100 can provide sound downward, and can be provided to the opening 13H (see FIG. 7) through the speaker hole 100SH.

The speaker 100 can be adjacent to the lower side 60D of the frame 60. The first speaker 100A can be adjacent to the left side 60L of the frame 60, and the second speaker 100B (see FIG. 5) can be adjacent to the right side of the frame 60. The coupling part 110" can be formed in one side of the housing 101H, and can be coupled to the fixing part 61 through a holder 120'". For example, a plurality of coupling parts 111" and 112" can be spaced apart from each other, and can be coupled to the plurality of fixing parts 611 and 612 through a plurality of holders 121'", 122'". Accordingly, the speaker 100 can be coupled to the rear surface of the frame 60.

Figure 17:
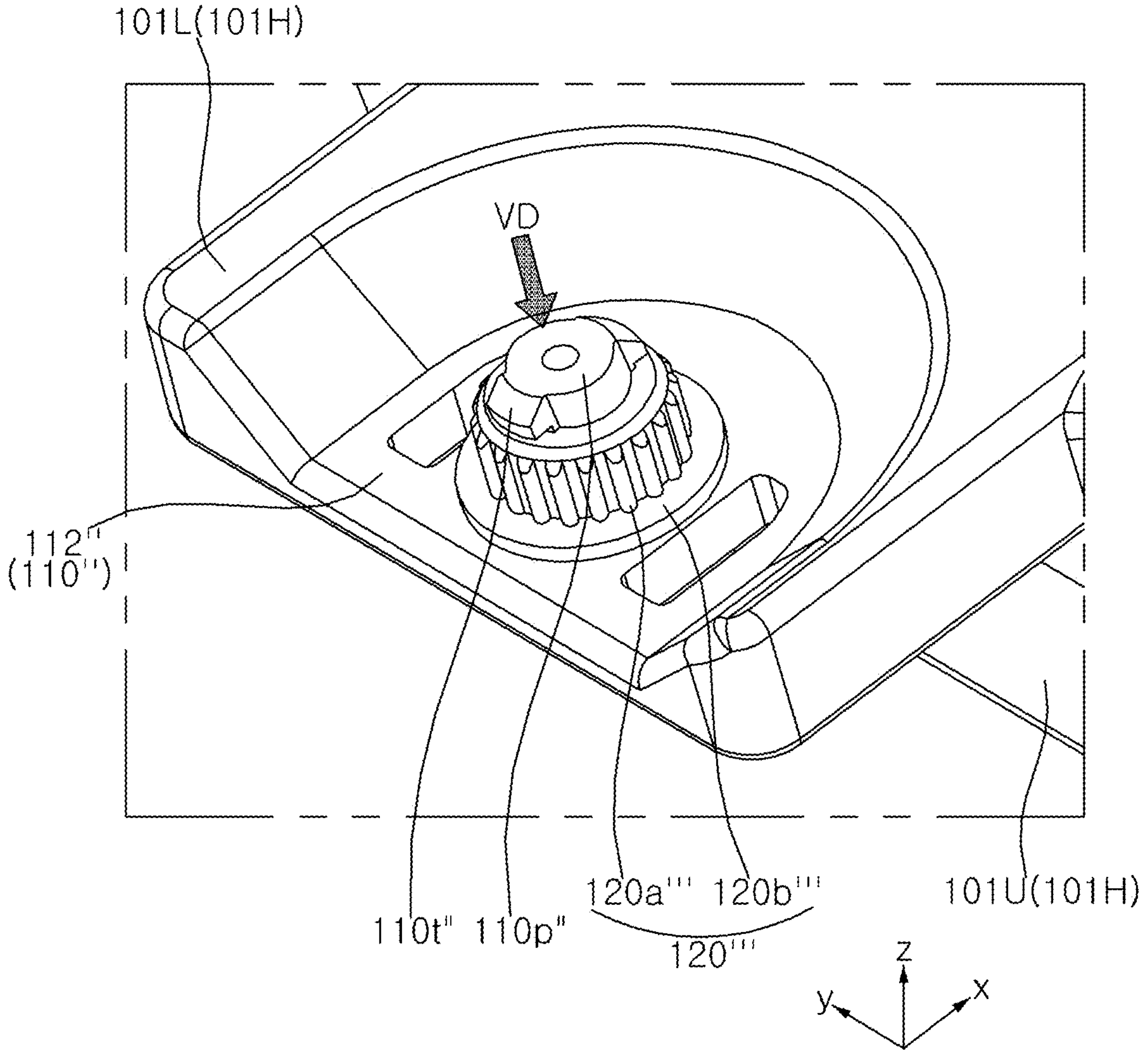
FIGS. 17 and 18 illustrate views of a holder and a coupling part according to an embodiment of the present disclosure.
Figure 18:
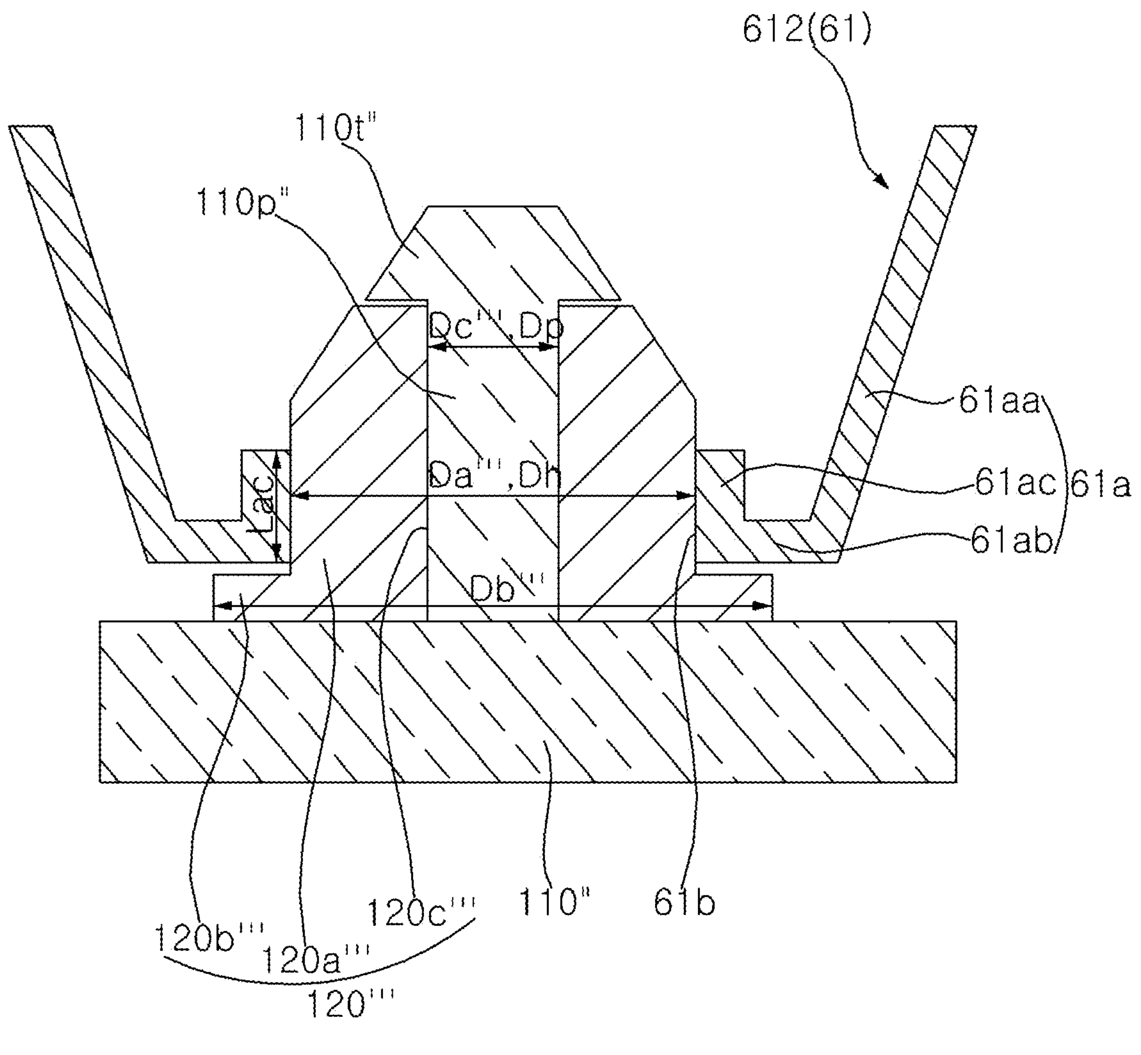

Referring to FIGS. 17 and 18, the coupling part 110" can be formed in one side of the housing 101H. For example, the coupling part 110" can be formed by recessing a part of the lower housing 101L.

The holder 120'" can include a body 120a'" and a leg 120b'". The leg 120b'" can be referred to as a flange 120b'". The body 120a'" can have a cylindrical shape, and can extend in a direction intersecting the fixing part 61. The leg 120b'" can protrude from one end of the body 120a'" in a radial direction of the body 120a'", and can extend in a circumferential direction of the body 120a'". For example, the leg 120b'" can have a circular flange type of shape. The holder 120'" can have elasticity. The holder 120'" can include a soft material such as rubber and silicon. Accordingly, the vibration of the speaker 100 coupled to the frame 60 can be suppressed from transmitting to the frame 60 through the holder 120'".

A boss 110p" can protrude forward from the coupling part 110," and can have a cylindrical shape. The boss 110p" can be referred to as a protrusion 110p" or a protruding part 110p." The boss 110p" can be inserted into a channel 120c'" formed in the central portion of the body 120a'" of the holder 120'". A stopper 110t" can protrude from the distal end of the boss 110p" in a radial direction of the boss 110p." For example, a plurality of stoppers 110t" can be spaced apart from each other in the circumferential direction of the boss 110p." The diameter Dc" of the channel 120c'" can be equal to or larger than the diameter Dp of the boss 110p." While the boss 110p" is vertically inserted into the body 120a'" (see arrow VD in FIG. 17), the channel 120c'" can be deformed by the stopper 110t," and then be restored to a state corresponding to the boss 110p." The stopper 110t" can be hooked to the body 120a'". That is, the holder 120'" can be detachably coupled to the boss 110p." For example, the holder 120'" can be pressed onto boss 110p" and be fixed and held in place by the stopper 110t".

The diameter Da'" of the body 120a'" before being inserted into the fixing hole 61b can be larger than the diameter Dh of the fixing hole 61b, and the body 120a'" can be pressed into the fixing hole 61b. The leg 120b'" can have a diameter Db'" larger than the diameter Dh of the fixing hole 61b, and can be hooked to the horizontal portion 61ab.

Accordingly, the speaker 100 can be vertically coupled to the fixing part 61 of the frame 60 through the holder 120'" vertically coupled to the coupling part 110." That is, even if the holder 120'" is located inside the inner boundary 101IL (see FIG. 15), the space 101S (see FIG. 15) in which the holder 120" can move horizontally may not be necessary. However, in order to maintain the coupling between the holder 120'" and the fixing part 61 at a certain level or higher, there may be limitations in reducing the length of the body 120a'" in contact with the vertical portion 61ac. In addition, in order to prevent the speaker 100 from being separated from the frame 60, a separate structure described later with reference to FIG. 19 can be used.

Figure 19:
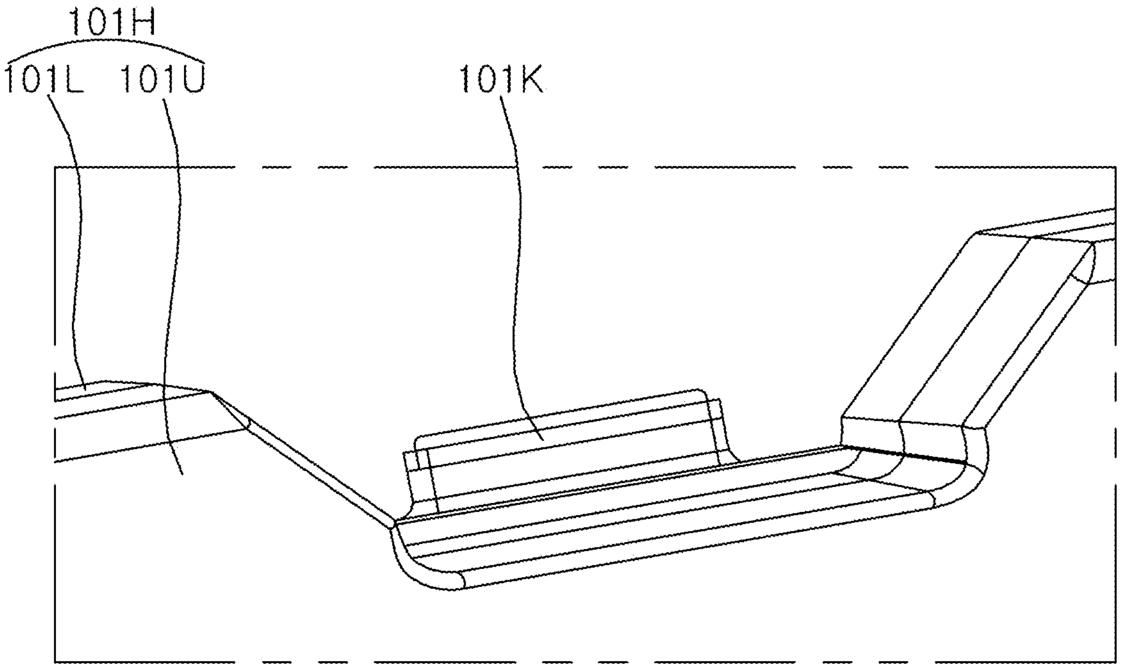
FIG. 19 illustrates an example of a hook according to an embodiment of the present disclosure.

Referring to FIG. 19, a hook 101K can be formed in one side of the housing 101H, and can be spaced apart from the holder 120'". For example, the hook 101K can protrude outward from one side of the lower housing 101L. The hook 101K can be hooked to a groove formed in the frame 60. For example, a plurality of hooks 101K can be spaced apart from each other along the rim of the housing 101H. Accordingly, the speaker 100 can be coupled to the frame 60 through the holder 120'" and the hook 101K. However, due to the hook 101K and the groove of the frame 60 to which the hook 101K is coupled, manufacturing cost can increase and various inconveniences can occur in process and design.

Figure 20:
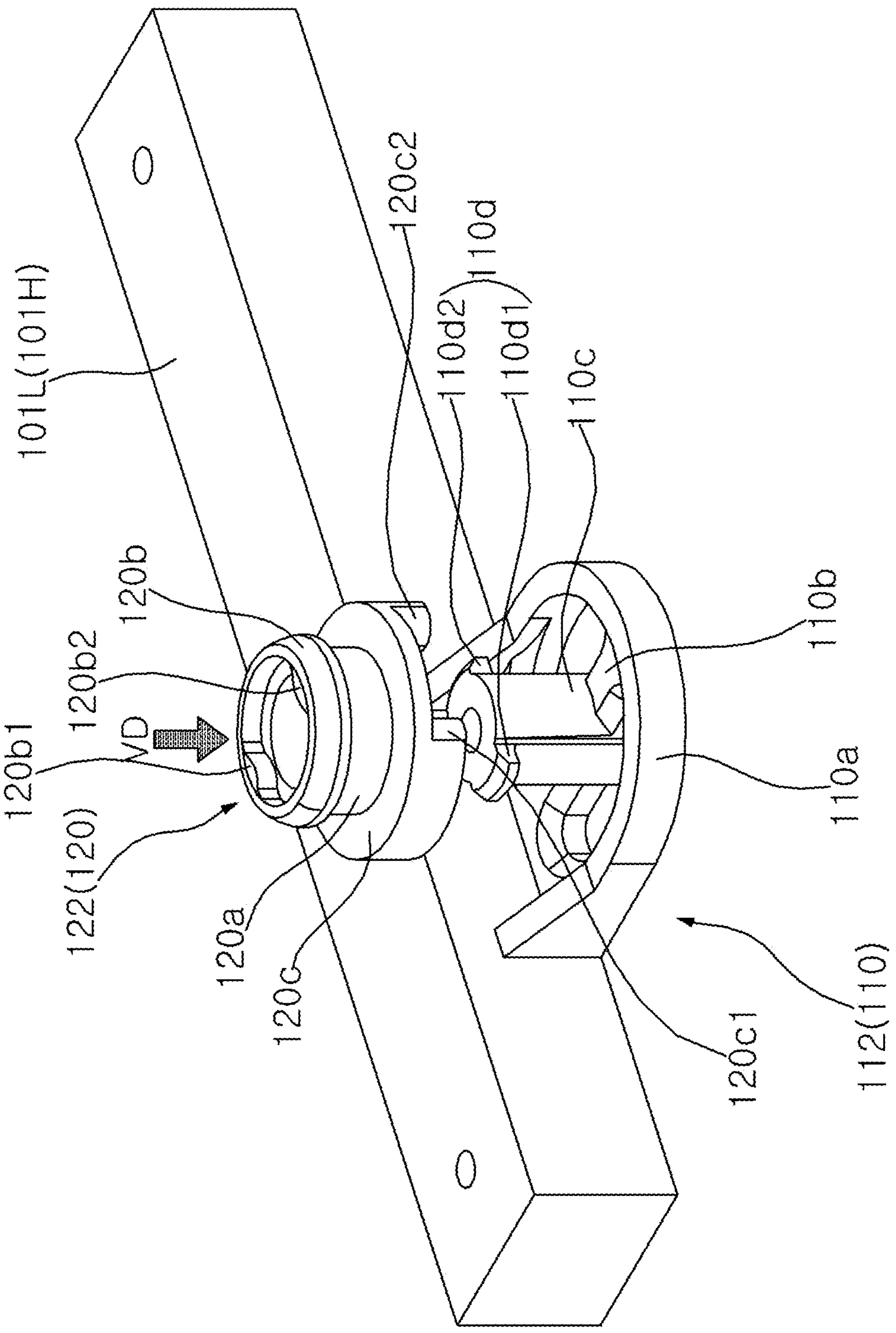
FIGS. 20 and 21 show views illustrating an example of a coupling part and a holder according to another embodiment of the present disclosure.
Figure 21:
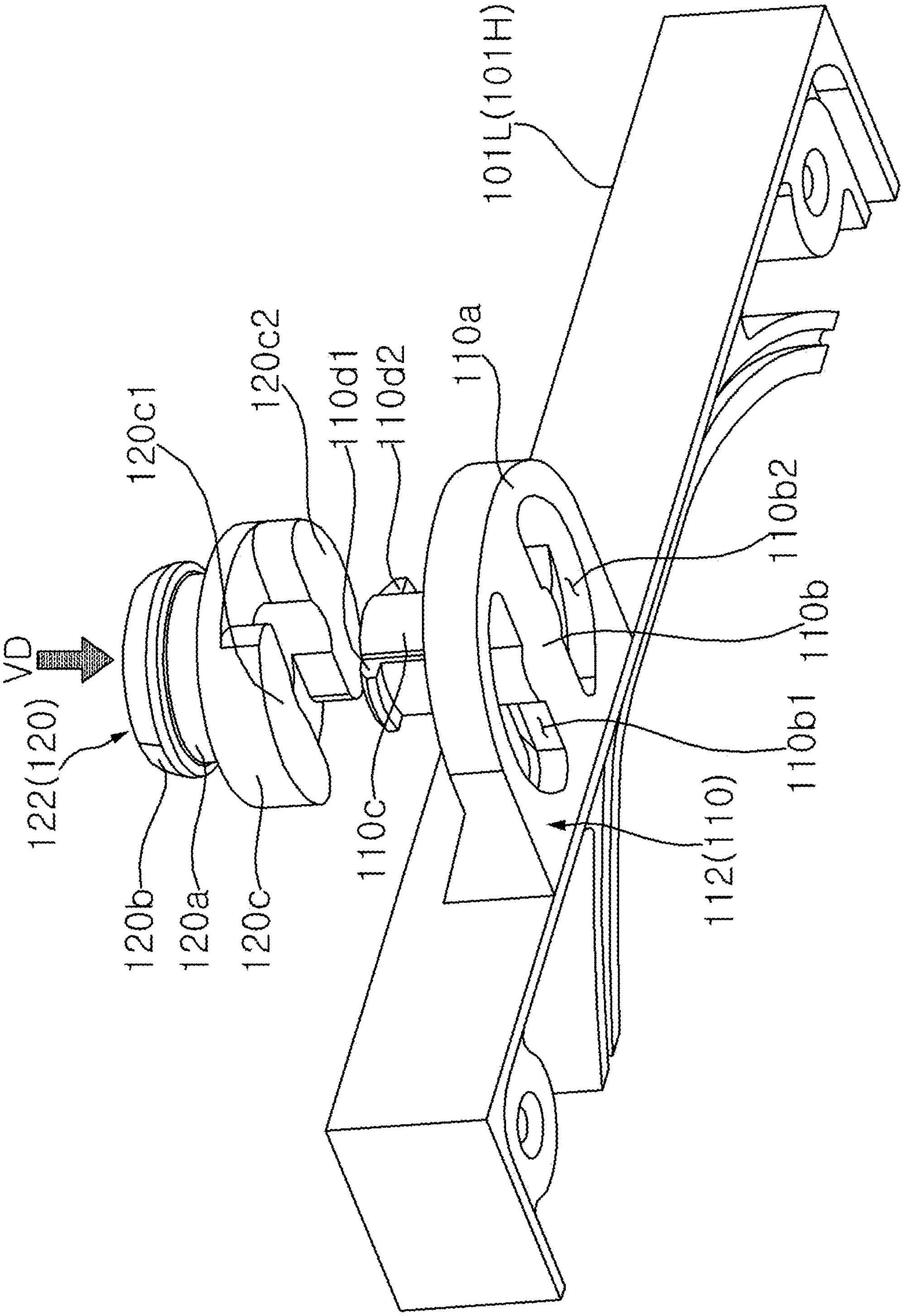

Referring to FIGS. 20 and 21, the coupling part 110 can be formed in one side of the housing 101H. For example, the coupling part 110 can protrude outward from one side of the lower housing 101L. The coupling part 110 can include a base 110a, a bridge 110b, and a boss 110c.

The base 110a can have a ring shape as a whole. The bridge 110b can extend across a center of the base 110a, and can be coupled to the inner circumferential surface of the base 110a. A plurality of holes 110b1 and 110b2 can be formed to penetrate through the base 110a. A first hole 110b1 can be opposite to a second hole 110b2 with respect to the bridge 110b. The first and second holes 110b1 and 110b2 can allow the legs 120c1 and 120c2 of the holder 120 to be securely seated within a lower portion of the coupling part 110 and can provide a better friction fit.

The boss 110c can protrude from the central portion of the bridge 110b toward the fixing hole 61b (see FIG. 8) of the fixing part 61, and can have a cylindrical shape as a whole. The boss 110c can be referred to as a protrusion 110c or a protruding part 110c. The stopper 110d can protrude from the distal end of the boss 110*c* in a radial direction of the boss 110*c*. For example, the plurality of stoppers 110*d*1 and 110*d*2 can be spaced apart from each other in the circumferential direction of the boss 110*c*. The stopper 110*d* can be referred to as a hook 110*d*. For example, the plurality of stoppers 110*d*1 and 110*d*2 can allow the coupling part 110 to have a letter "T" shape for securely hooking onto the holder 120, but embodiments are not limited thereto.

The holder 120 can include a body 120*c*, a neck 120*a*, and a head 120*b*. The holder 120 can have elasticity. The holder 120 can include a soft material such as rubber and silicon. For example, the holder 120 can act as a type of isolation mount for reducing or prevented vibrations from the speaker, while also severing to attach the speaker to the rear of the display. Accordingly, the vibration of the speaker 100 coupled to the frame 60 can be suppressed from transmitting to the frame 60 through the holder 120'.

The body 120*c* can have a ring shape. The diameter of the body 120*c* can be smaller than the diameter of the base 110*a*. A plurality of legs 120*c*1 and 120*c*2 can protrude toward the plurality of holes 110*b*1 and 110*b*2 from a first surface of the body 120*c*. A first leg 120*c*1 can be aligned with the first hole 110*b*1, and can have the same shape as the first hole 110*b*1. A second leg 120*c*2 can be aligned with the second hole 110*b*2, and can have the same shape as the second hole 110*b*2. Also, the first leg 120*c*1 and the second leg 120*c*2 can also be referred to as feet (e.g., a first foot and a second foot). For example, the holder 120 can have a shape that resembles a pawn piece in chess with two feet or two legs, but embodiments are not limited thereto.

The neck 120*a* can protrude from a second surface of the body 120*c* opposite the first surface of the body 120*c* in the length direction of the body 120*c*. The diameter of the neck 120*a* can be smaller than the diameter of the body 120*c*. That is, the neck 120*a* can be stepped or have a ridged portion or overhang portion (e.g., cave) with respect to the body 120*c*.

The head 120*b* can be opposite to the body 120*c* with respect to the neck 120*a* (e.g., the neck 120*a* is between the head 120*b* and the body 120*c*). The head 120*b* can protrude from the distal end of the neck 120*a* in a radial direction of the neck 120*a*, and can extend in a circumferential direction of the neck 120*a*. The diameter of the head 120*b* can be larger than the diameter of the neck 120*a*. That is, the head 120*b* can be stepped or have a ridged portion or overhang portion (e.g., cave) with respect to the neck 120*a*.

Figure 22:
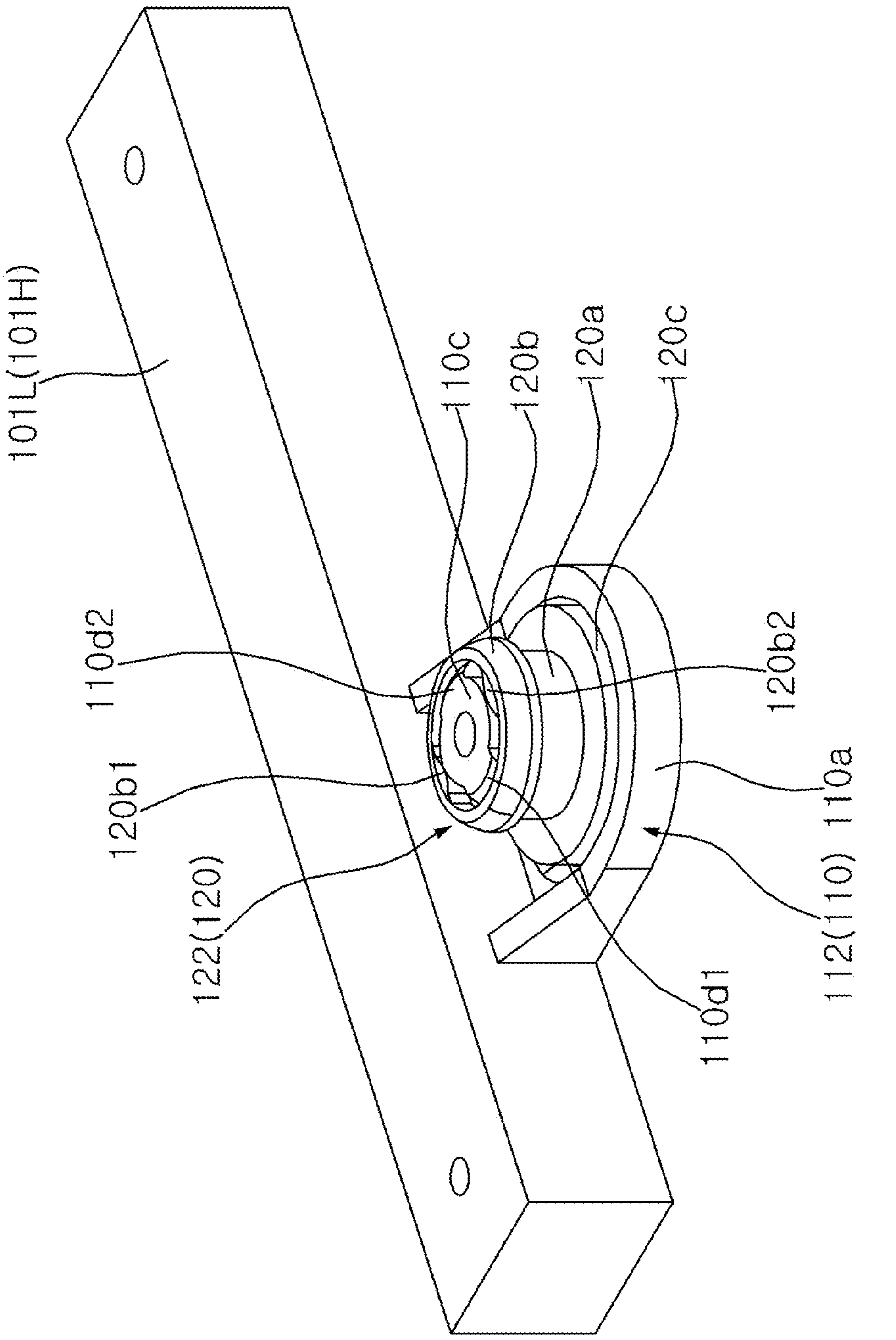
FIGS. 22 and 23 show views illustrating an example of a coupling part of the housing of a speaker and a holder according to an embodiment of the present disclosure.
Figure 23:
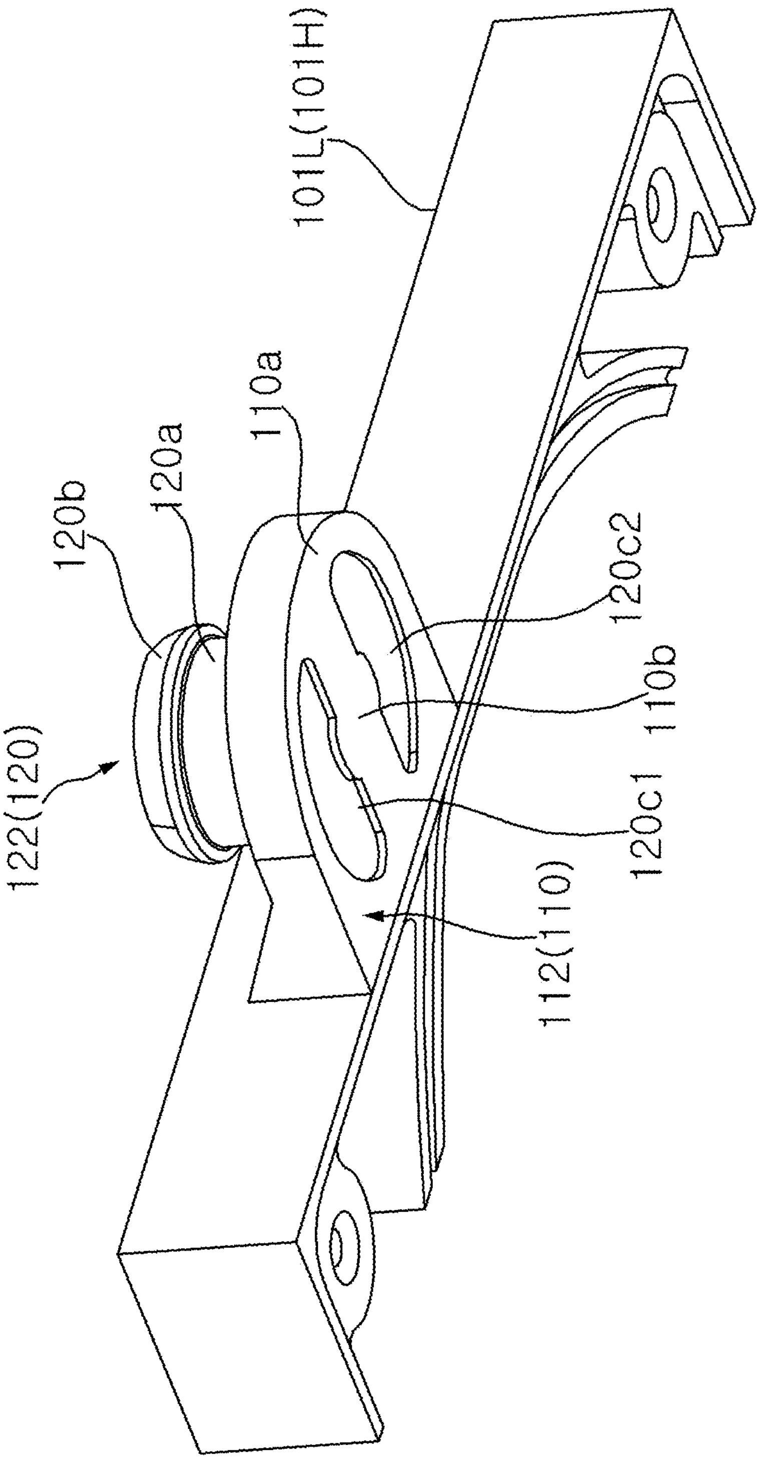

Referring to FIGS. 22 and 23, the holder 120 can be seated on the base 110*a*. The boss 110*c* can penetrate through a center of the body 120*c*, the neck 120*a*, and the head 120*b*, and a portion of the body 120*c* between the first leg 120*c*1 and the second leg 120*c*2 can be hooked to the bridge 110*b*. The first leg 120*c*1 can be inserted into the first hole 110*b*1, and the second leg 120*c*2 can be inserted into the second hole 110*b*2. The first and second legs 120*c*1 and 120*c*2 and the first and second holes 110*b*1 and 110*b*2 can guide coupling of the holder 120 and the base 110*a*. For example, the first leg 120*c*1 and the second leg 120*c*1 can straddle the bridge and be seated into the first and second holes 110*b*1 and 110*b*2, which can prevent twisting or turning and provide for better coupling. The sidewall of the base 110*a* can cover at least a portion of the side surface of the body 120*c*.

First and second stoppers 110*d*1 and 110*d*2 can be located inside the head 120*b*, and can be hooked to the distal end of the neck 120*a*. First and second protrusions 120*b*1 and 120*b*2 can protrude from the inner circumferential surface of the head 120*b* toward the boss 110*c*, and can be adjacent to the outer circumferential surface of the boss 110*c*, in this way, an even better friction fit can be provided. In other words, the first and second stoppers 110*d*1 and 110*d*2 can allow the boss 110*c* to have "T" shape that can be pinched between the first and second protrusions 120*b*1 and 120*b*2 inside the head 120*b* of the holder 120. The first and second protrusions 120*b*1 and 120*b*2 can be alternately disposed with the first and second stoppers 110*d*1 and 110*d*2. Due to the first and second protrusions 120*b*1 and 120*b*2 and the first and second stoppers 110*d*1 and 110*d*2, the holder 120 can be stably inserted into the fixing hole 61*b* (see FIG. 24). Accordingly, the holder 120 can be detachably coupled to the coupling part 110 in a vertical direction. The holder 120 coupled to the coupling part 110 may not be separated from the coupling part 110 in the vertical direction by being hooked to the bridge 110*b* and the stoppers 110*d*1 and 110*d*2.

Figure 24:
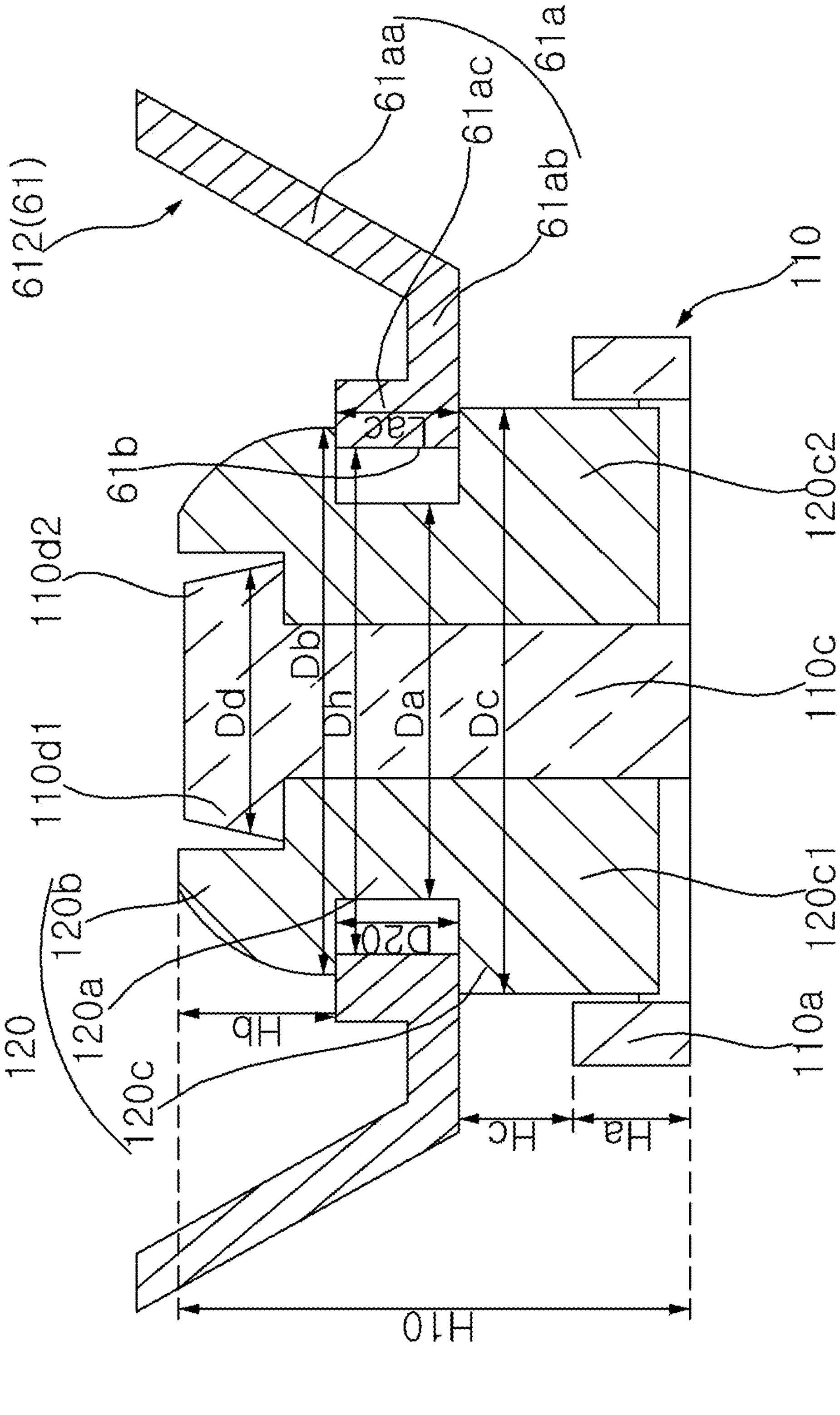
FIG. 24 illustrates an example cross section of a coupling part inserted into a holder of according to an embodiment of the present disclosure.

Referring to FIG. 24, the diameter Da of the neck 120*a* can be equal to or smaller than the diameter Dh of the fixing hole 61*b*. The diameter Db of the head 120*b* can be larger than the diameter Dh of the fixing hole 61*b*. The diameter Dc of the body 120*c* can be larger than the diameter Dh of the fixing hole 61*b*. As the length of the neck 120*a*, the distance D20 between the body 120*c* and the head 120*b* can be equal to or larger than the length Lac of the vertical portion 61*ac*. When the neck 120*a* and the head 120*b* are inserted into the fixing part 61 through the fixing hole 61*b*, the neck 120*a* can be located in the fixing hole 61*b*, the body 120*c* can be hooked to the horizontal portion 61*ab*, and the head 120*b* can be hooked to the vertical portion 61*ac*. That is, the holder 120 can be detachably coupled to the fixing part 61.

Accordingly, the speaker 100 can be vertically coupled to the fixing part 61 of the frame 60 through the holder 120 vertically coupled to the coupling part 110. That is, even if the holder 120 is located inside the inner boundary 101IL (see FIG. 15), the space 101S (see FIG. 15) in which the holder 120 can move horizontally may not be necessary (e.g., the speaker can be attached to the rear of the display with less room needed for maneuvering). In addition, the speaker 100 coupled to the fixing part 61 can be spaced apart from the rear surface of the frame 60, thereby minimizing the transmission of vibration of the speaker 100 to the frame 60.

In addition, since the head 120*b* and the body 120*c* are hooked to the fixing part 61 and the holder 120 is coupled to the fixing part 61, the length of the neck 120*a* can be significantly reduced (e.g., the holder 120 can be flatter and the overall configuration can be slimmer or thinner). That is, an increase in the thickness of device due to the holder 120 can be minimized. A height H10 of the head 120*b* with respect to the coupling part 110 can be 10 mm or less. For example, the height Ha of the sidewall of the base 110*a* can be 2.3 mm, the height Hc of the portion of the body 120*c* not covered by the sidewall of the base 110*a* can be 0.7 mm, the distance D20 between the body 120*c* and the head 120*b* can be 2.3 mm, the height Hb of the head 120*b* can be 1.7 mm, and the height H10 can be 7.0 mm.

In addition, since the holder 120 is coupled to the fixing part 61 as the head 120*b* and the body 120*c* are hooked to the fixing part 61, the speaker 100 can be stably coupled to the frame 60 without a separate hook 101K (see FIG. 19).

Figure 25:
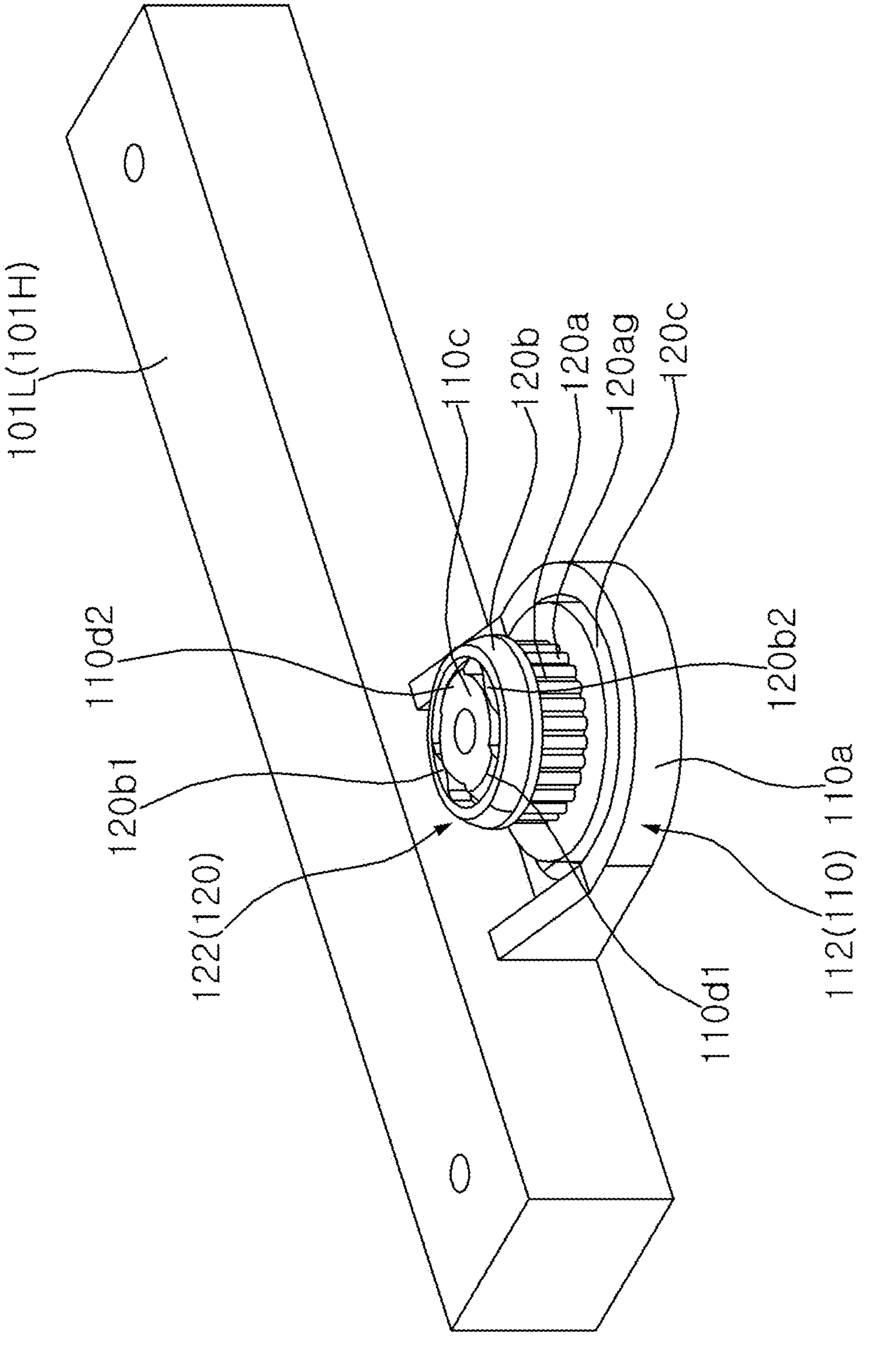
FIGS. 25 and 26 illustrates an example of a holder with a plurality of protrusions around the neck according to an embodiment of the present disclosure.
Figure 26:
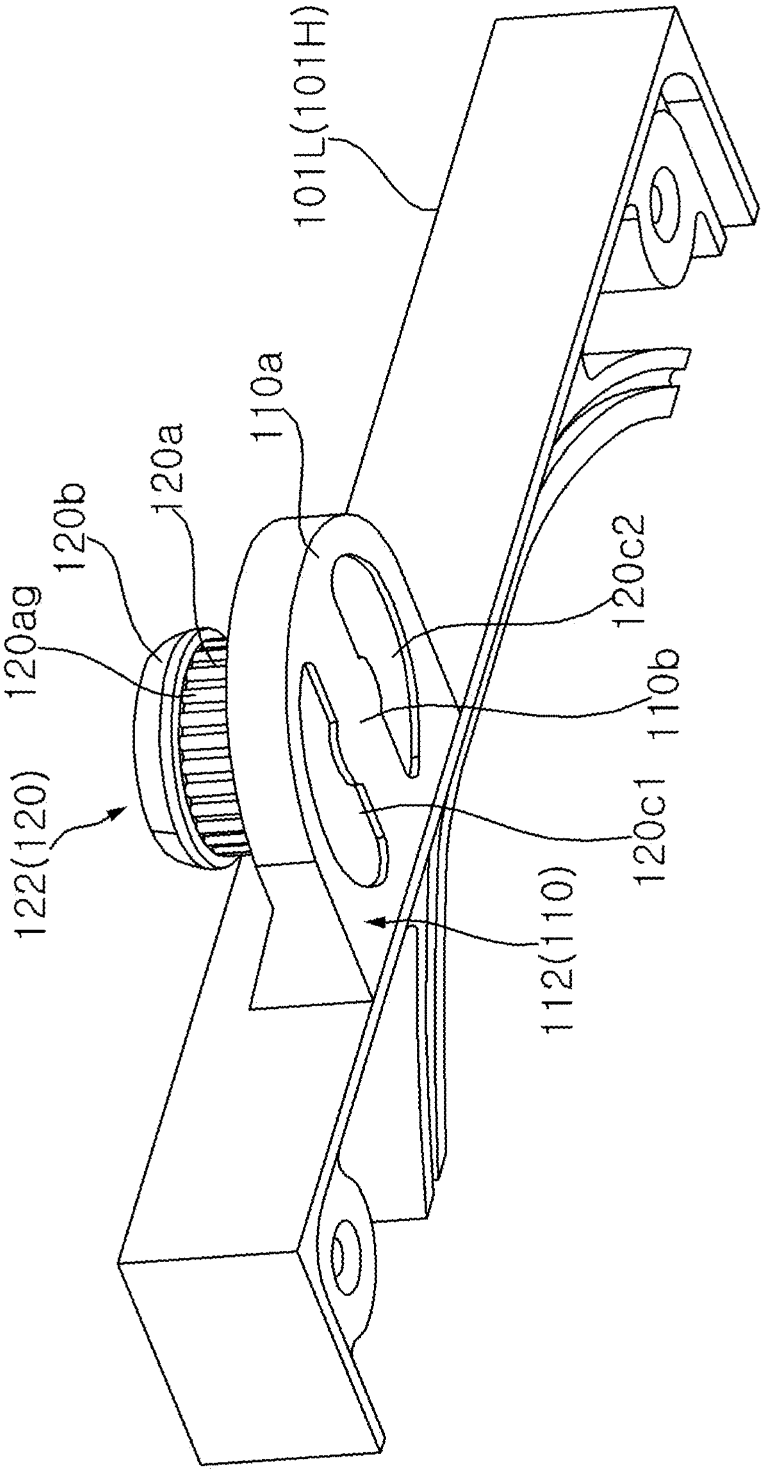

Referring to FIGS. 25 and 26, a plurality of protrusions 120*ag* can be formed on the outer circumferential surface of the neck 120*a*, and can be arranged along the outer circumferential surface (e.g., vertical ridge portions). The protrusion 120*ag* can be referred to as embossing 120*ag*. Before the neck 120*a* is inserted into the fixing hole 61*b*, the diameter of the plurality of protrusions 120*ag* with respect to the center of the neck 120_a_ can be larger than the diameter Dh of the fixing hole 61_b_, the plurality of protrusions 120_ag_ can be pressed into the fixing hole 61_b_, can be pressed into the vertical portion 61_ac_, and can be in close contact with the vertical portion 61_ac_ between the neck 120_a_ and the vertical portion 61_ac_.

For example, the diameter Dh (see FIG. 24) of the fixing hole 61_b_ can be 8 mm, the diameter Da of the neck 120_a_ can be 7.5 mm, and the diameter (the diameter before the neck 120_a_ is inserted into the fixing hole 61_b_) of the protrusions 120_ag_ can be 8.2 mm.

Accordingly, even if the distance D20 between the body 120_c_ and the head 120_b_, as the length of the neck 120_a_, is larger than the length Lac of the vertical portion 61_ac_, the holder 120 coupled to the fixing part 61 may not move in the vertical direction. For example, the distance D20 between the body 120_c_ and the head 120_b_ can be 2.3 mm, and the length Lac of the vertical portion 61_ac_ can be 1.7 mm.

Figure 27:
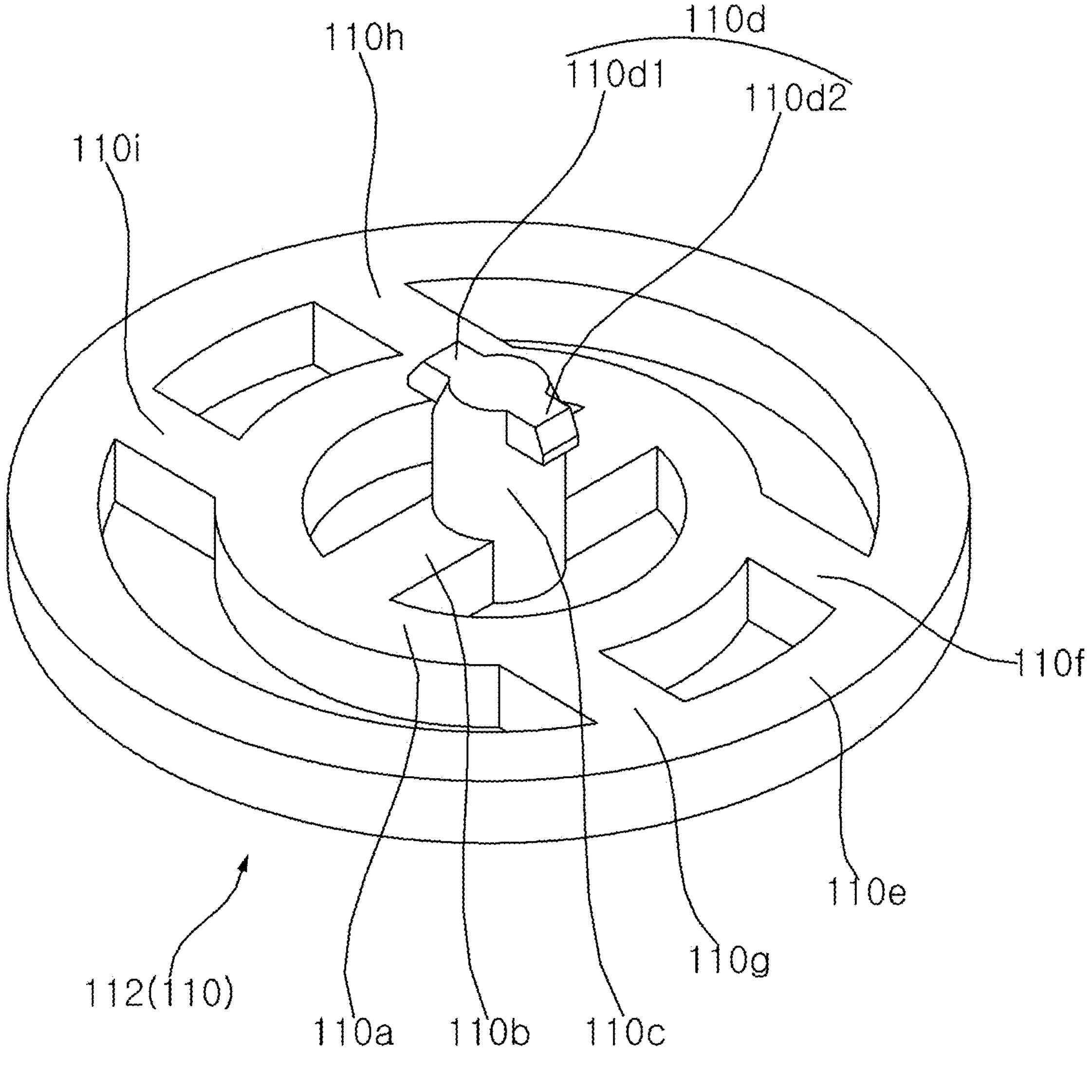
FIG. 27 illustrates an example of a coupling part according to an embodiment of the present disclosure.

Referring to FIG. 27, the diameter of the outer base 110_e_ can be larger than the diameter of the base 110_a_, and can be a concentric circle or ring of the base 110_a_. The plurality of bridges 110_f_, 110_g_, 110_h_, and 110_i_ can be coupled to the outer circumferential surface of the base 110_a_ and the inner circumferential surface of the outer base 110_e_. The rigidity of the coupling part 110 can be improved by the outer base 110_e_ and the amount of material used during manufacture can be reduced. For example, a relatively heavy speaker 100 can be coupled to the frame 60 through the holder 120 and the coupling part 110 having the base 110_a_ and the outer base 110_e_.

Referring to FIGS. 1 to 27, a sound device according to an aspect of the present disclosure can include: a frame; a speaker adjacent to the frame; a coupling part formed at one side of the speaker, and facing the frame; and a holder positioned between the frame and the coupling part, and coupled to the coupling part in a direction toward the coupling part from the frame, in which the holder can penetrate the frame in a direction toward the frame from the coupling part, and can be coupled to the frame.

The speaker can include a housing which has an inner space, and at which the coupling part is formed, and the coupling part can be positioned in a rim of the housing or inside the rim.

The holder can include a soft material, and the speaker can be spaced apart from the frame.

The coupling part can include a plurality of coupling parts spaced apart from each other, and the holder can include a plurality of holders coupled to the plurality of coupling parts.

The coupling part can include: a base on which the holder is seated; a protruding part extending from the base in a direction toward the frame from the coupling part, and penetrating the holder; and a stopper protruding from an end of the protruding part, and hooked to the holder.

The base can have a ring shape, and the coupling part further can include: a bridge which crosses the base, and at which the protruding part is formed; and a pair of holes formed at the base, and opposite to each other with respect to the bridge.

The holder can include a pair of legs protruding from the holder toward the pair of holes, and inserted into the pair of holes.

The coupling part further can include an outer base which is a concentric of the base having a larger diameter than the base, and which is coupled to an outer circumferential surface of the base.

The holder can include: a body seated on the base; a neck opposite to the base with respect to the body, and having a smaller diameter than the body; and a head opposite to the body with respect to the neck, and having a larger diameter than the neck, in which the protruding part can penetrate the body, the neck, and the head, in which the stopper can be positioned inside the head, and can be hooked to an end of the neck.

The holder can include a plurality of protrusions which protrude from an inner circumferential surface of the head toward an outer circumferential surface of the protruding part, and which are adjacent to the outer circumferential surface of the protruding part, in which the stopper can include a plurality of stoppers alternately disposed with the plurality of protrusions.

The frame further can include a fixing part which is formed while being pressed from one surface of the frame toward the coupling part, and which has a fixing hole, in which the neck can be positioned in the fixing hole, in which a portion of the fixing part defining a boundary of the fixing hole overlaps the head and the body.

The fixing part can include: an inclined portion extend in an inclined direction with respect to the frame; a horizontal portion bent from the inclined portion toward the fixing hole; and a vertical portion bent from the horizontal portion toward the frame, and defining the boundary of the fixing hole, in which a distance between the head and the body can be equal to or larger than a length of the vertical portion.

The holder can include a plurality of protrusions which are formed at an outer circumferential surface of the neck, and which are arranged along the outer circumferential surface of the neck, in which a diameter of the plurality of protrusions with respect to a center of the neck can be larger than a diameter of the fixing hole, before the neck is inserted into the fixing hole.

A display device can include the sound device, and a display panel coupled to the frame of the sound device.

The sound device can include a plurality of sound devices spaced apart from each other along an edge of the frame.

Effects of a sound device and a display device having the same according to the present disclosure are described as follows.

According to at least one of the embodiments of the present disclosure, it is possible to provide a structure that couples a speaker to a frame and minimizes the transmission of vibrations of the speaker to the frame.

According to at least one of the embodiments of the present disclosure, it is possible to provide a structure that minimizes the cost for coupling a speaker and a frame.

According to at least one of the embodiments of the present disclosure, it is possible to provide a sound device that can minimize volume loss of a speaker due to a coupling structure between the speaker and a frame located inside the speaker.

According to at least one of the embodiments of the present disclosure, it is possible to provide a structure capable of stably coupling a speaker to a frame while having a small thickness.

According to at least one of the embodiments of the present disclosure, it is possible to a structure capable of preventing a speaker from being shaken or separated from a frame while being coupled to the frame.

Certain embodiments or other embodiments of the disclosure described above are not mutually exclusive or distinct from each other. Any or all elements of the embodiments of the disclosure described above can be combined or combined with each other in configuration or function.

For example, a configuration "A" described in one embodiment of the disclosure and the drawings and a configuration "B" described in another embodiment of the disclosure and the drawings can be combined with each other. Namely, although the combination between the configurations is not directly described, the combination is possible except in the situation where it is described that the combination is impossible.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

What is claimed is:

1. A sound device comprising:

a frame;

a speaker disposed adjacent to the frame;

a coupling part disposed at one side of the speaker, facing toward the frame, and including a protruding part extending in a direction toward the frame; and a holder positioned between the coupling part and the frame, the holder penetrating into a portion of the frame to couple the speaker to the frame, wherein the protruding part penetrates through the holder, and wherein the coupling part includes a stopper protruding from an end of the protruding part, the stopper being hooked onto a portion of the holder.

2. The sound device of claim 1, wherein the speaker includes a housing having an inner space, and wherein the coupling part is disposed at an outer portion of a rim of the housing or inside the rim of the housing.

3. The sound device of claim 1, wherein the holder includes at least one of a flexible material, a rubber material or a soft material, and wherein the speaker is spaced apart from the frame by the holder.

4. The sound device of claim 3, wherein the coupling part includes a plurality of coupling parts spaced apart from each other, and wherein the holder includes a plurality of holders coupled to the plurality of coupling parts, respectively.

5. The sound device of claim 1, wherein the coupling part includes:

a base on which the holder is seated.

6. The sound device of claim 5, wherein the base of the coupling part has a ring shape, wherein the coupling part further including:

a bridge extending from one side of the base to another side of the base, and the protruding part being disposed on the bridge; and a pair of holes in the base, the pair of holes being disposed on opposite sides of the bridge.

7. The sound device of claim 6, wherein the holder includes a pair of legs protruding from the holder in a direction toward the pair of holes in the base of the coupling part, the pair of legs of the holder being inserted into the pair of holes in the base of the coupling part.

8. The sound device of claim 6, wherein the coupling part further includes an outer base having a concentric ring shape relative to the base and having a larger diameter than the base, and wherein the outer base is coupled to an outer circumferential surface of the base.

9. The sound device of claim 5, wherein the holder includes:

a body seated on the base of the coupling part;

a neck disposed opposite to the base with respect to the body, the neck having a smaller diameter than the body; and a head disposed opposite to the body with respect to the neck, the head having a larger diameter than the neck, wherein the protruding part of the coupling part penetrates through each of the body, the neck, and the head of the holder, and wherein the stopper of the coupling part is positioned inside the head of the holder, and a portion of the stopper is hooked onto at least a portion of the neck of the holder or at least a portion of the head of the holder.

10. The sound device of claim 9, wherein the holder includes a plurality of protrusions protruding from an inner circumferential surface of the head in a direction toward an outer circumferential surface of the protruding part, the plurality of protrusions in the head being disposed adjacent to the outer circumferential surface of the protruding part of the coupling part.

11. The sound device of claim 9, wherein the frame further includes:

a fixing part extending toward the coupling part, the fixing part including a fixing hole, wherein the neck of the holder is positioned in the fixing hole of the fixing part, and wherein a portion of the fixing part defining a boundary of the fixing hole overlaps with the head and the body of the holder.

12. The sound device of claim 11, wherein the fixing part includes:

an inclined portion extending in an inclined direction with respect to the frame;

a horizontal portion bent from the inclined portion in a direction toward the fixing hole; and a vertical portion bent from the horizontal portion in a direction toward the frame, the vertical portion defining the boundary of the fixing hole, wherein a distance between the head and the body is equal to or larger than a length of the vertical portion of the fixing part.

13. The sound device of claim 12, wherein the holder includes a plurality of protrusions arranged along an outer circumferential surface of the neck, wherein a diameter of the plurality of protrusions with respect to a center of the neck is larger than a diameter of the fixing hole, before the neck is inserted into the fixing hole of the fixing part.

14. A display device comprising:

the sound device of claim 1; and a display panel coupled to the frame of the sound device.

15. The display device of claim 14, wherein the sound device includes a plurality of sound devices spaced apart from each other along an edge of the frame.

16. A holder for coupling a sound device to a frame, the holder comprising:

a head;

a body;

a neck disposed between the head and the body; and a hole penetrating through the head, the neck and the body, wherein the head has a tapered shape in which a diameter of the head decreases in a direction away from the neck, and wherein the head includes an overhang part protruding from the neck, and wherein the holder further comprises a pair of protrusions disposed in a hollow portion of the head, the pair of protrusions extending toward a center of the hole.

17. The holder of claim 16, wherein a width of the neck is smaller than a width of the head and a width of the body.

18. The holder of claim 16, further comprising:

a pair of legs extending from the body and being spaced apart from each other.

19. The holder of claim 18, wherein the pair of legs extend parallel to each other.

20. The holder of claim 16, wherein an outer circumference of the body is larger than an outer circumference of the head, and the outer circumference of the head is larger than an outer circumference of the neck.

21. A coupling part for coupling a sound device to a frame, the coupling part comprising:

a base;

a bridge extending from one side of the base to another side of the base;

a protruding part disposed on the bridge;

a pair of holes disposed on opposite sides of the bridge; and a stopper protruding from a distal end of the protruding part.

22. The coupling part of claim 21, wherein the stopper is tapered relative to the base.

23. The coupling part of claim 21, wherein the stopper includes a first stopper and a second stopper extending in opposite directions.

24. The coupling part of claim 23, wherein the first and second stoppers and the protruding part form a "T" shape.

25. The coupling part of claim 21, wherein the base has a ring shape, wherein the coupling part further comprises:

an outer base having a concentric ring shape relative to the base and having a larger diameter than the base, and wherein the outer base is coupled to an outer circumferential surface of the base.

26. The coupling part of claim 21, wherein the base is connected to a frame, wherein the frame, the base, the bridge, the protruding part, and the stopper are integrally formed, and a bottom surface of the base is even with a bottom surface of the bridge.

* * * * *